United States Patent
Tuncer et al.

(10) Patent No.: US 11,486,911 B2
(45) Date of Patent: Nov. 1, 2022

(54) VOLTAGE-VARIATION DETECTION UNDER CLOCK FLUCTUATIONS

(71) Applicant: Google LLC, Mountain View, CA (US)

(72) Inventors: Emre Tuncer, Santa Cruz, CA (US); Huachang Xu, Mountain View, CA (US); Ramprasad Raghavan, Sunnyvale, CA (US); Fanny Gur, Los Gatos, CA (US); Manish Harnur, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 71 days.

(21) Appl. No.: 16/936,169

(22) Filed: Jul. 22, 2020

(65) Prior Publication Data

US 2021/0148957 A1  May 20, 2021

Related U.S. Application Data

(63) Continuation of application No. PCT/US2019/062282, filed on Nov. 19, 2019.

(51) Int. Cl.
*G01R 19/165* (2006.01)
*G06F 21/75* (2013.01)
(Continued)

(52) U.S. Cl.
CPC ......... *G01R 19/16533* (2013.01); *G06F 1/10* (2013.01); *G06F 21/755* (2017.08); *H03K 5/00* (2013.01); *H03K 2005/00019* (2013.01)

(58) Field of Classification Search
None
See application file for complete search history.

(56) References Cited

U.S. PATENT DOCUMENTS 7,355,435 B2 * 4/2008 Ferraiolo ......... G01R 31/31721
257/48
7,859,429 B2 * 12/2010 Satoh ................ G01C 21/3694
340/905

(Continued)

FOREIGN PATENT DOCUMENTS

EP          3376423        9/2018
TW        201505375        2/2015
(Continued)

OTHER PUBLICATIONS

"Foreign Office Action", TW Application No. 109128889, dated Jun. 10, 2021, 3 pages.

(Continued)

*Primary Examiner* — Thomas J. Hiltunen
*Assistant Examiner* — Khareem E Almo
(74) *Attorney, Agent, or Firm* — Colby Nipper PLLC

(57) ABSTRACT

Detecting voltage-based attacks on an integrated circuit (IC) is difficult in the presence of clock jitter. Propagating signals can exhibit a total delay that is due to a delay component resulting from a voltage-based attack and a delay characteristic resulting from clock fluctuation. Voltage-variation detection circuitry includes first and second voltage-dependent circuits and a voltage analysis circuit. The voltage-dependent circuits produce first and second signals that are indicative of a voltage level responsive to a clock signal and based on different first and second voltage sensitivities. The voltage analysis circuit generates a voltage alert signal based on the first and second signals. A combined signal neutralizes the delay characteristic in the first and second signals, but the delay component due to the voltage variation can be at least partially maintained. Thus, a voltage-based attack is detectable in the presence of clock fluctuation by using two voltage-dependent circuits.

20 Claims, 11 Drawing Sheets

(51) Int. Cl.
    *G06F 1/10*            (2006.01)
    *H03K 5/00*         (2006.01)

(56) References Cited

U.S. PATENT DOCUMENTS

| | | | |
|---|---|---|---|
| 9,164,563 B2* | 10/2015 | Berry, Jr. | G06F 1/28 |
| 9,459,314 B1* | 10/2016 | Chang | H03K 5/131 |
| 9,495,971 B2 | 11/2016 | Ullberg et al. | |
| 9,984,732 B2* | 5/2018 | Seomun | G11C 7/222 |
| 2007/0013414 A1* | 1/2007 | Paillet | H03K 19/00346 |
| | | | 327/50 |
| 2011/0193589 A1* | 8/2011 | Chua-Eoan | G01R 29/26 |
| | | | 326/16 |
| 2013/0300463 A1 | 11/2013 | Gemmeke et al. | |
| 2014/0036559 A1* | 2/2014 | Watanabe | G01R 19/00 |
| | | | 363/84 |
| 2014/0145707 A1* | 5/2014 | Tanabe | G01R 19/16547 |
| | | | 324/76.41 |
| 2014/0334049 A1 | 11/2014 | Singh et al. | |
| 2016/0034014 A1* | 2/2016 | Turullols | H03K 3/037 |
| | | | 327/225 |
| 2017/0075404 A1* | 3/2017 | Kitaji | G06F 1/305 |
| 2019/0079575 A1* | 3/2019 | Hanson | G06F 1/3237 |
| 2019/0229736 A1* | 7/2019 | Kosonocky | H03L 7/0991 |
| 2021/0148957 A1* | 5/2021 | Tuncer | H03K 5/00 |
| 2021/0396789 A1* | 12/2021 | Lentz | G01R 19/16538 |

FOREIGN PATENT DOCUMENTS

| | | |
|---|---|---|
| TW | 201537332 | 10/2015 |
| TW | 201617632 | 5/2016 |

OTHER PUBLICATIONS

"Foreign Office Action", TW Application No. 109128889, dated Aug. 4, 2021, 3 pages.
"International Search Report and Written Opinion", Application No. PCT/US2019/062282, dated Aug. 7, 2020, 12 pages.
Zhang, et al., "Sensing Voltage Transients Using Built-in Voltage Sensor", ECE 6332/4332—Fall 2012, University of Virginia, 2012, 6 pages.
"Foreign Office Action", KR Application No. 10-2022-7012862, Jun. 15, 2022, 9 pages.
"International Preliminary Report on Patentability", Application No. PCT/US2019/062282, May 17, 2022, 7 pages.

* cited by examiner

VOLTAGE-VARIATION DETECTION UNDER CLOCK FLUCTUATIONS

PRIORITY APPLICATION

This application claims priority to and is a continuation application of International Application No. PCT/US2019/062282, filed 19 Nov. 2019, the disclosure of which is incorporated herein by reference in its entirety.

BACKGROUND

Electronic devices play integral roles in manufacturing, communication, transportation, healthcare, commerce, social interaction, and entertainment. For example, electronic devices power the server farms that provide cloud-based, distributed computing functionality for commerce and communication. Electronic devices are also embedded in many different types of modern equipment, from medical devices to appliances and from vehicles to industrial tools. Additionally, one electronic device—the smartphone—has practically become a necessity to have within arm's reach. With electronic devices becoming pervasive and crucial to many aspects of modern life, device security has become imperative.

Many people are familiar with malware, which is sometimes generally referred to as a "computer virus." A resilient operating system, safe computing practices, and an anti-malware program can often keep a user's information safe from remote threats by combating many types of malware. However, the security of information stored by electronic devices can also be jeopardized through physical attacks on hardware. In other words, some hardware attacks can circumvent or undermine the strategies listed above to enable a bad actor to access information that was intended to be kept safe.

The hardware of an electronic device includes an integrated circuit (IC) that provides the intelligence to enable some desired functionality, including functionality that may utilize information that is to be safeguarded. To support protection of this information, some ICs include security circuitry to facilitate encryption and decryption of the information that is to be safeguarded, such as financial data, passwords, and secret keys. Unfortunately, bad actors can physically attack an IC, including the security circuitry thereof, to attempt to gain access to the information that is stored in "hardened" circuit portions or that is otherwise safeguarded by the IC. Consequently, it is beneficial to incorporate into the IC hardware-based measures that can identify, block, repel, or otherwise thwart such physical attacks.

This Background section is provided to generally present the context of the disclosure. Unless otherwise indicated herein, material described in this section is neither expressly nor impliedly admitted to be prior art to the present disclosure or the appended claims.

SUMMARY

This Summary section is provided to introduce simplified concepts of voltage-variation detection under clock fluctuations. These simplified concepts are further described below in the Detailed Description. Accordingly, this section is not intended to identify essential features of the claimed subject matter nor is it intended for use in determining the scope of the claimed subject matter.

Electronic devices include integrated circuits (ICs) that may be vulnerable to voltage or frequency spike attacks. Such physical attacks can modify timing characteristics of a circuit and introduce artificial metastability. A bad actor can leverage the artificial metastability to place the circuit in a state that leaks data that is intended to be safeguarded. To protect such data, circuitry on an IC chip can detect the physical attack and issue an alert signal. In response to the alert signal, the IC chip can take some action to protect against the attack.

A voltage-based attack, for example, involves varying a voltage level of a circuit portion to induce metastability. The circuit portion can therefore detect the attack by determining that the voltage level is being varied. Determining that the voltage level is being varied can be based on an observation that a propagating signal is delayed using circuitry that is sensitive to voltage. Meanwhile in some environments, frequency fluctuations of a clock signal, or clock fluctuations, are intentionally created to combat against physical attacks on an IC chip. A clock fluctuation can introduce a degree of randomization. The randomization makes inferring data values from the metastability imposed on monitored signals more difficult. Due to the use of clock fluctuations in security circuitry, the voltage-based attack can occur in the presence of frequency fluctuations of the clock signal. In these situations, detecting the voltage-based attack is challenging because a signal delay may be due partially to the varying voltage resulting from the voltage-based attack and partially due to the clock fluctuation that is intended to combat physical attacks.

To address this challenge, some implementations generate first and second signals using respective first and second voltage-dependent circuits with different first and second voltage sensitivities. Consequently, the first and second signals react differently to voltage variations such that signal delay components of the two signals differ between them. However, the first and second signals react similarly to a clock signal undergoing frequency fluctuations. Each of the first and second signals therefore include a delay characteristic that is substantially the same to each other due to the clock fluctuation. By combining the first and second signals to produce a combined signal, the delay characteristic that is due to the clock fluctuation is neutralized, but a delay component due to the voltage variation can be at least partially maintained. This combined signal can therefore be used to detect a voltage-based attack that varies a voltage level even in the presence of clock fluctuations.

Each of the first and second voltage-dependent circuits includes a delay circuit that includes multiple delay units. Each delay unit has a corresponding voltage sensitivity for the respective first or second voltage-dependent circuit. Each delay unit can be realized using, for example, at least one transistor having a respective threshold voltage that is different between the two first and second voltage-dependent circuits. In example operations, a toggle flip-flop generates an edge for each cycle. The edge propagates through a respective set of delay units at a propagation speed that is dependent on the respective threshold voltage of the constituent transistors. Each of the first and second voltage-dependent circuits also includes a sample circuit, which includes a buffer chain and multiple sampling registers. The delayed edge is coupled from a respective delay circuit to a buffer chain of a respective sample circuit for the edge to travel through the respective buffer chain. The multiple sampling registers are coupled to the buffer chain to capture how far the delayed edge travels along the buffer chain during each cycle. The first or second signal output by the first or second voltage-dependent circuit respectively includes an edge at a position that is representative of a corresponding respective signal delay.

A voltage analysis circuit accepts the first and second signals respectively from the first and second voltage-dependent circuits to determine if a voltage-based attack is occurring. The analysis includes combining the first and second signals and comparing a combined signal to at least one threshold. The analysis can also include comparing the first and second signals to each other to determine if a voltage spike is positive or negative. In these manners, by employing the first and second voltage-dependent circuits with corresponding first and second voltage sensitivities, a voltage-based attack can be detected while an IC chip, or a portion thereof, is experiencing clock fluctuations.

Aspects described below include an apparatus for voltage-variation detection under clock fluctuations. The apparatus includes a first voltage-dependent circuit, a second voltage-dependent circuit, a voltage analysis circuit, and a clock line configured to propagate a clock signal. The first voltage-dependent circuit is coupled to the clock line, and the first voltage-dependent circuit is configured to produce a first signal that is indicative of a voltage level responsive to the clock signal and based on a first voltage sensitivity. The second voltage-dependent circuit is coupled to the clock line, and the second voltage-dependent circuit is configured to produce a second signal that is indicative of the voltage level responsive to the clock signal and based on a second voltage sensitivity. The voltage analysis circuit is coupled to the first voltage-dependent circuit and the second voltage-dependent circuit. The voltage analysis circuit is configured to generate a voltage alert signal based on the first signal and the second signal.

Aspects described below include a method performed by an apparatus for voltage-variation detection under clock fluctuations. The method includes providing a clock signal. The method also includes producing a first signal indicative of a voltage level responsive to propagating the clock signal based on a first voltage sensitivity. The method additionally includes producing a second signal indicative of the voltage level responsive to propagating the clock signal based on a second voltage sensitivity. The method further includes generating a voltage alert signal based on the first signal and the second signal.

Aspects described below include an integrated circuit (IC) for voltage-variation detection under clock fluctuations. The apparatus includes a clock line, a first voltage-dependent circuit, a second voltage-dependent circuit, and a voltage analysis circuit. The clock line is configured to propagate a clock signal with one or more frequency fluctuations. The first voltage-dependent circuit is coupled to the clock line. The first voltage-dependent circuit is configured to propagate the clock signal using at least one first transistor having a first threshold voltage to produce a first signal that is indicative of a voltage level. The second voltage-dependent circuit is coupled to the clock line. The second voltage-dependent circuit is configured to propagate the clock signal using at least one second transistor having a second threshold voltage to produce a second signal that is indicative of the voltage level. The voltage analysis circuit is coupled to the first voltage-dependent circuit and the second voltage-dependent circuit. The voltage analysis circuit is configured to detect a voltage-based attack by neutralizing the one or more frequency fluctuations of the clock signal based on a combination of the first signal and the second signal.

Aspects described below include a system for voltage-variation detection under clock fluctuations that may be realized as at least part of an apparatus or an IC thereof. The system includes means for detecting voltage variations in the presence of frequency fluctuations of a clock signal, or clock fluctuations. The means for detecting voltage variations is configured to provide a clock signal. The means for detecting voltage variations is also configured to produce a first signal indicative of a voltage level responsive to propagating the clock signal based on a first voltage sensitivity. The means for detecting voltage variations is additionally configured to produce a second signal indicative of the voltage level responsive to propagating the clock signal based on a second voltage sensitivity. The means for detecting voltage variations is further configured to generate a voltage alert signal based on the first signal and the second signal.

BRIEF DESCRIPTION OF THE DRAWINGS

Apparatuses of and techniques for voltage-variation detection under clock fluctuations are described with reference to the following drawings. The same numbers are used throughout the drawings to reference like features and components:

FIG. 6-1 is a circuit diagram illustrating an example sample circuit of a voltage-dependent circuit.

FIG. 6-2 is a circuit diagram illustrating another example sample circuit of a voltage-dependent circuit.

DETAILED DESCRIPTION

Overview

Figure 1:
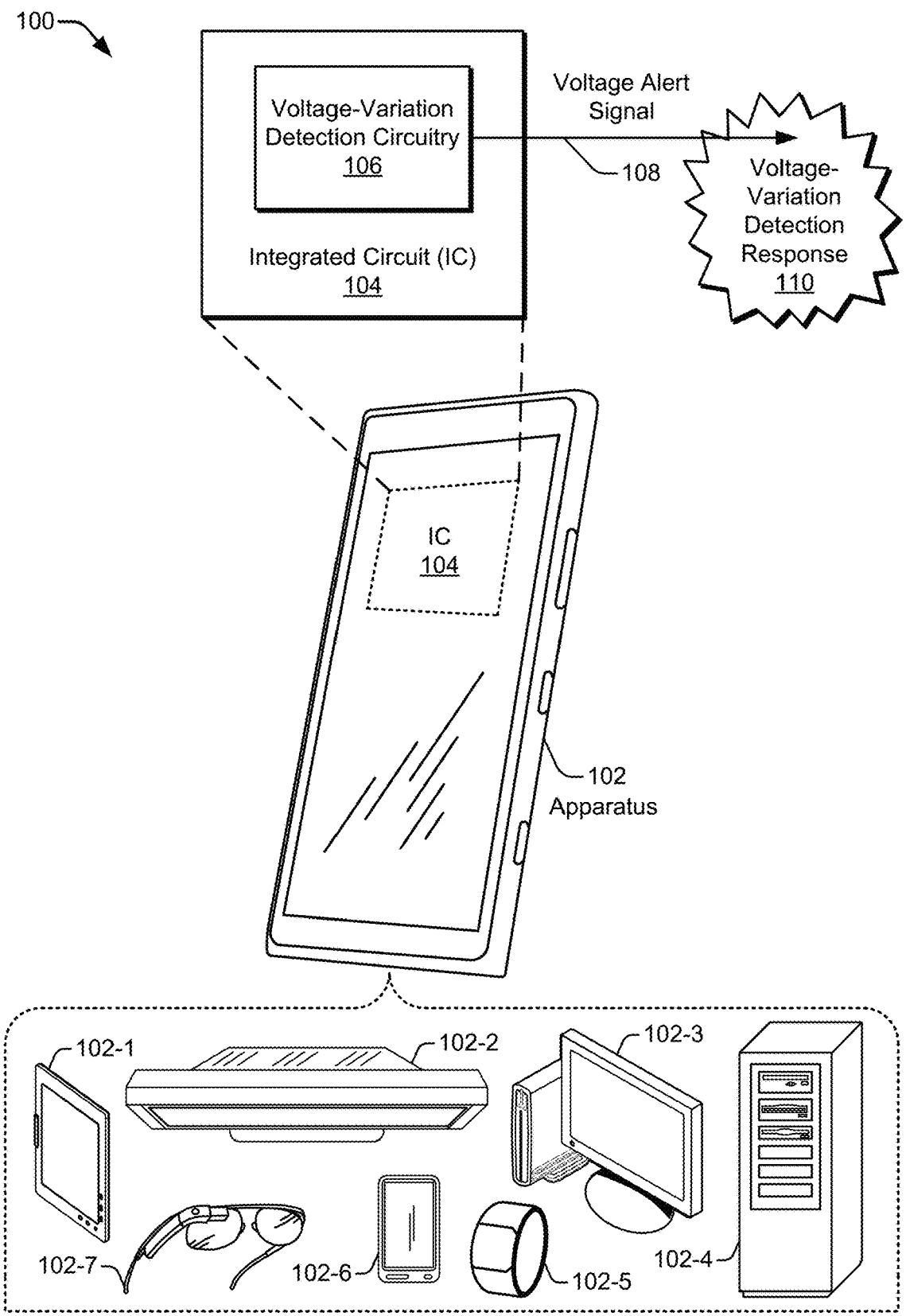
FIG. 1 illustrates an example apparatus with an integrated circuit (IC) that includes voltage-variation detection circuitry to implement voltage-variation detection under clock fluctuations.

Electronic devices include integrated circuit (IC) chips. Some IC chips include security circuitry that is responsible for keeping information secure. Unfortunately, bad actors, including those that have direct access to an IC chip, can perform a physical attack on the IC chip to attempt to obtain information that is intended to be kept secure. For example, security circuitry can store a secret key that is used to encrypt data that is intended to be safeguarded. A physical attack can target the secret key, and the secret key enables data to be decrypted and therefore accessed by the bad actor. In some cases, as part of a physical attack, the bad actor applies voltages or other signaling parameters that are outside the bounds of specified limits for the IC chip generally or the security circuitry specifically.

Applying signals or inputs that exceed specified limits can cause the circuitry to react in unplanned or unintended manners. As part of a physical attack, the bad actor repeatedly applies the excessive signals or inputs and can also vary the values thereof. During this process, the bad actor monitors internal or external signaling of the IC chip. By monitoring this signaling over time, the bad actor can tease out an indication of the secret key. Thus, the IC chip can leak or otherwise reveal the stored secret key and inadvertently expose any information that was encrypted with the secret key.

It is therefore beneficial to make it more difficult for the bad actor to tease out the secret key or other information that is stored on an IC chip and intended to be safeguarded. One approach to combat these types of physical attacks is to change a frequency of a clock signal that is controlling a timing of the operation of the security circuitry. By changing the clock signal frequency, a measure of randomization is introduced into the signaling that the bad actor is monitoring. This measure of randomization increases the difficulty of inferring or otherwise extracting the targeted data. Thus, one approach to increasing IC chip security is to adjust a clock signal frequency or cause the frequency of the clock signal to fluctuate.

In one example approach to physically attacking security circuitry, a bad actor changes a voltage level of a supply voltage or input signals in a manner that is inconsistent with the specifications of the IC chip. To be able to implement a countermeasure against a physical attack, the physical attack is first detected. An example scheme for detecting a voltage-based attack is to ascertain that the voltage is changing or is set at an inappropriate level. To do so, a voltage level is determined. The voltage level can be determined by employing one or more circuit devices that are voltage-dependent. Specifically, a speed of propagation of a signal through voltage-dependent circuit devices varies based on the voltage level of the supply voltage. If an elapsed time or a delay of a signal propagating through a series of voltage-dependent circuit devices changes, the presence of a voltage change can be inferred. Thus, another approach to increasing IC chip security is to employ voltage-dependent circuit devices that detect the voltage level based on a delay period of a propagating signal.

As described above, in some circumstances it is beneficial to adjust a clock signal frequency to increase IC chip security by introducing a measure of randomness to signals that may be monitored by a bad actor. In other circumstances, it is beneficial to detect, based on a delay of a propagating signal, a voltage level change caused by the bad actor. Unfortunately, it has been difficult to implement both strategies together. The latter strategy involves using a delay period of a signal that propagates through circuitry operating responsive to a clock signal, which means the delay period is also responsive to a frequency of the clock signal. The former strategy involves changing the frequency of the clock signal. Consequently, a delay period that is intended to reflect a change in a voltage level may also undesirably reflect a change in the frequency of the clock signal. In short, a signal propagated through voltage-dependent circuit devices is delayed based on a contemporaneous voltage level of a supply voltage, but the propagated signal also includes a temporal characteristic that is caused by a frequency fluctuation of the clock signal. It is therefore difficult to ascertain how much of an observed delay is caused by a voltage change induced by a bad actor and how much of the observed delay is the result of the frequency fluctuation of the clock signal.

It would be advantageous to be able to detect a voltage-based attack on circuitry that is operating under a clock signal with a fluctuating frequency. To do so, in example implementations, an IC chip includes voltage-variation detection circuitry having two voltage-dependent circuits and a voltage analysis circuit. A first voltage-dependent circuit has a first voltage sensitivity, and a second voltage-dependent circuit has a second voltage sensitivity. With different voltage sensitivities, the two circuits propagate a signal through a delay circuit at different speeds. For example, the first voltage-dependent circuit produces a first signal responsive to a clock signal and based on the first voltage sensitivity. The second voltage-dependent circuit produces a second signal responsive to the clock signal and based on the second voltage sensitivity. Each signal is affected by changes to a voltage level of a supply voltage to a different degree—e.g., each has a different delay due to the supply voltage variation.

However, each of the first signal and the second signal is affected in a substantially similar manner to frequency fluctuations of the clock signal. Each signal therefore includes a substantially similar delay characteristic that is due to a clock fluctuation. In operation, the voltage analysis circuit combines (e.g., determines a difference between) the first signal and the second signal. The resulting combined signal neutralizes (e.g., substantially cancels) the common delay characteristic. The combined signal can be compared to at least one threshold to detect if a voltage glitch has occurred. As described herein, the voltage analysis circuit can also compare the first and second signals to each other to ascertain if a detected voltage glitch is a positive voltage glitch or a negative voltage glitch.

In these manners, a voltage-based attack can be detected in the presence of clock fluctuation by using two voltage-dependent circuits. Accordingly, frequency fluctuations of a clock signal to thwart physical attacks on an IC chip can be used in combination with delay-based approaches for determining voltage variations to detect voltage-based physical attacks.

Although some implementations are depicted or explained in terms of an example safeguarding of a stored secret key, described implementations are applicable generally to protecting unauthorized access to data and signaling of an IC chip. Also, described implementations are applicable to circuitry generally and are not limited to "hardened" or other security-oriented circuitry. Further, clock fluctuation—or a fluctuating frequency of a clock signal—can result from a design of the IC chip for security or other purposes or can result from a physical attack by a bad actor.

Example implementations in various levels of detail are discussed below with reference to the associated figures. The discussion below first sets forth an example operating environment and then describes example hardware, schemes, and techniques. Example methods are described thereafter with reference to flow charts or diagrams.

Example Environment

FIG. 1 illustrates an example apparatus 102 with an integrated circuit (IC) 104 that includes voltage-variation detection circuitry 106 to implement voltage-variation detection under clock fluctuations. In this example, the apparatus 102 is depicted as a smartphone. However, the apparatus 102 may be implemented as any suitable computing or electronic device, such as a mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., clothing or watch), Internet of Things (IoTs) device, electronic portion of a machine or some equipment, server computer or portion thereof (e.g., a server blade), and the like. Illustrated examples of the apparatus 102 include a tablet device 102-1, a smart television 102-2, a desktop computer 102-3, a server computer 102-4, a smartwatch 102-5, a smartphone or document reader 102-6, and intelligent glasses 102-7.

In example implementations, the apparatus 102 includes at least one IC 104. The IC 104 can be realized as a general-purpose processor, a system-on-chip (SoC), a security IC, a memory chip, a communications IC (e.g., that performs encryption or decryption on information being transmitted or received), and so forth. The IC 104 includes voltage-variation detection circuitry 106. In operation, the voltage-variation detection circuitry 106 monitors at least a portion of the IC 104 to detect a voltage variation that may indicate a voltage-based attack is occurring. Responsive to detection of a variation of a voltage level that exceeds some threshold or specified range, the voltage-variation detection circuitry 106 generates a voltage alert signal 108. Thus, the voltage alert signal 108 can be indicative of a detected variation of a monitored voltage level. Responsive to issuance of the voltage alert signal 108, the IC 104 or another portion of the apparatus 102 can implement a voltage-variation detection response 110, which is described with reference to FIG. 2.

Figure 2:
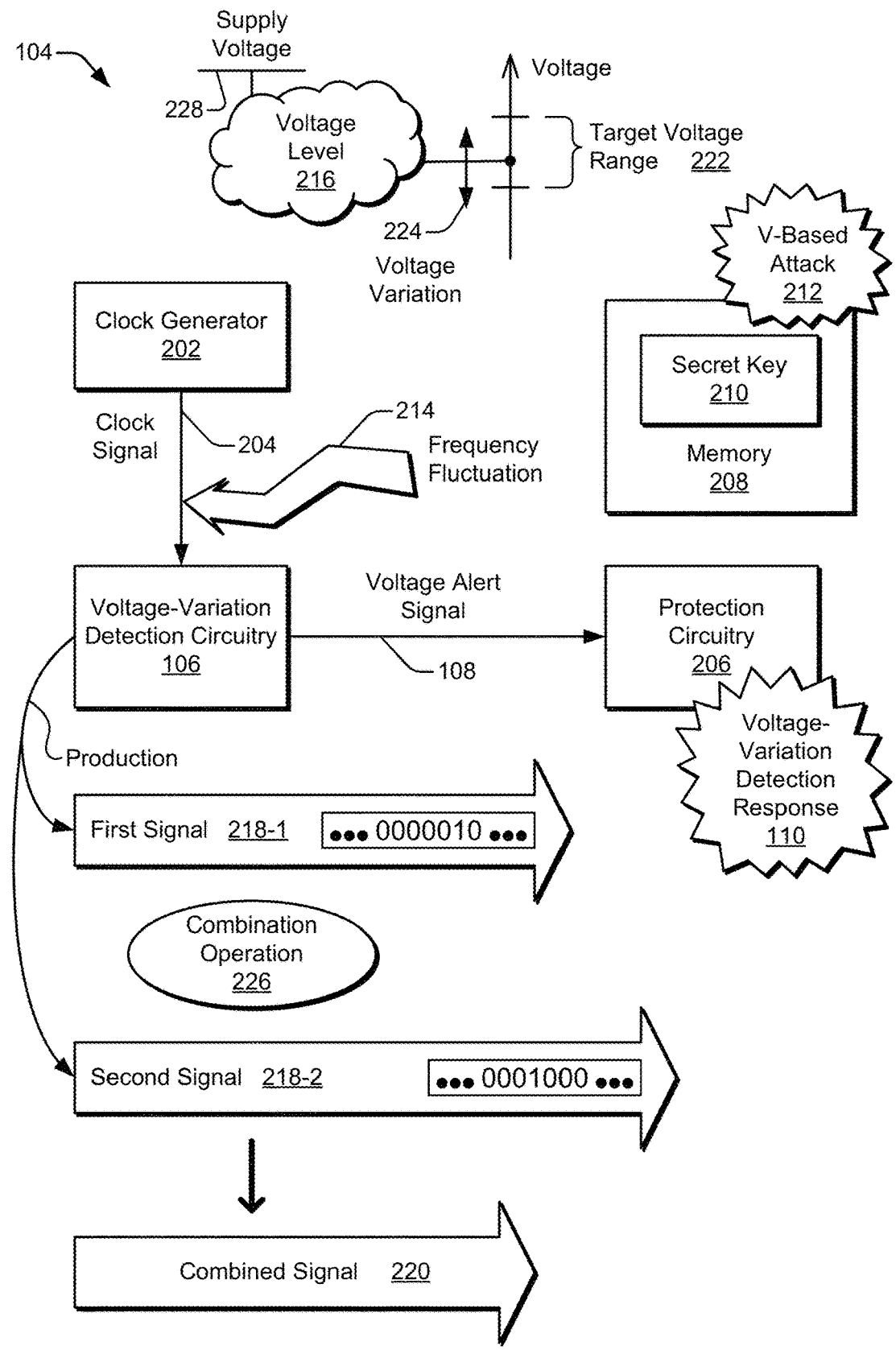
FIG. 2 illustrates an example IC that includes protection circuitry and the voltage-variation detection circuitry that can implement voltage-variation detection under clock fluctuations.

Example Schemes, Techniques, and Hardware for Voltage-Variation Detection Under Clock Fluctuations FIG. 2 illustrates an example IC 104 that includes protection circuitry 206 and voltage-variation detection circuitry 106 that can implement voltage-variation detection under clock fluctuations. The IC 104 includes a voltage level 216. The voltage level 216 can correspond to, for example, a supply voltage 228 (e.g., Vdd) for one or more power domains or circuitry regions on the IC 104. On-chip or off-chip power management circuitry (not shown) can generate the supply voltage 228 and maintain the voltage level 216 of the supply voltage 228 within a target voltage range 222. The voltage level 216 can, however, experience a voltage variation 224 that is outside the bounds of, or exceeds, the target voltage range 222. Such a voltage variation 224 can be caused by a voltage-based attack 212 on the IC 104. As described herein, the voltage-variation detection circuitry 106 detects the voltage variation 224 and generates a voltage alert signal 108 in response to the detection.

In some scenarios, the voltage-based attack 212 may be targeting a secret key 210 that is stored in a memory 208. The secret key 210 can be used to encrypt or decrypt information that is to be protected, including information that is to be displayed or communicated to another device. In some cases, a bad actor may seek to infer the secret key 210 by monitoring signaling that occurs while the secret key 210 is being used for encryption or decryption. Signatures may be obtained, for instance, by extracting current flows during cryptographic operations. The signatures can be manipulated to reveal the secret key 210 by repeating certain operations and comparing the monitored signals. To introduce randomness into the monitored signaling, and thereby thwart efforts to repeatedly perform the same operations, a clock signal 204 may be altered.

In some implementations, a clock signal 204 exhibits at least one frequency fluctuation 214. For instance, the clock signal 204 can have a frequency that fluctuates over time. This frequency fluctuation 214 can result from an attack on the IC 104. However, a frequency fluctuation 214 can also or instead be intentionally created as a security measure to introduce randomness into signaling that may potentially be monitored as part of a physical attack. For example, a clock generator 202, or a part of a clock tree, can be configured to generate the clock signal 204 to have a frequency fluctuation 214. The frequency fluctuation 214 of the clock signal 204 can be referred to as "clock jitter." Although the frequency fluctuation 214 of the clock signal 204 makes a voltage-based attack 212 more difficult, the frequency fluctuation 214 can also make detecting the voltage-based attack 212 more difficult.

Some approaches to detecting a voltage-based attack 212 involve obtaining a signal with a component that exhibits a voltage-based delay. If the delay is too great or otherwise deviates too far from an expected delay period, circuitry can infer that a voltage-based attack 212 is occurring. However, a signal that is propagated under a frequency fluctuation 214 of a clock signal 204 can also have a delay characteristic resulting from the clock fluctuation. In other words, a signal may exhibit a delay that results from a voltage variation 224 from a voltage-based attack 212, a delay that results from a frequency fluctuation 214 of the clock signal 204 that has been intentionally created to enhance security, or a delay that is a combination of these causes. Determining a cause of a delay that may result from multiple different sources, and thus whether a voltage-based attack 212 may be occurring, is challenging.

Implementations that are described herein enable a delay characteristic resulting from a clock signal 204 with a frequency fluctuation 214 in at least one signal to be neutralized. Thus, a delay component resulting from a voltage-based attack 212 that remains in the at least one signal, or a signal that is a derivative thereof, can be determined to detect the attack. To do so, the voltage-variation detection circuitry 106 produces two signals: a first signal 218-1 and a second signal 218-2. The voltage-variation detection circuitry 106 includes two circuits with different voltage sensitivities, each of which produces a respective signal 218. Examples of such circuits are described below, starting with FIG. 3. Due to the different voltage sensitivities, each of the first signal 218-1 and the second signal 218-2 has a different delay component that is based on the voltage variation. However, each signal 218 has a clock-fluctuation-based delay characteristic that is approximately equivalent to that of the other signal.

In example operations, the voltage-variation detection circuitry 106 combines the first signal 218-1 and the second signal 218-2 to produce a combined signal 220. A combination operation 226 substantially cancels the clock-fluctuation-based delay characteristic that is present in each signal 218 to produce the combined signal 220 in which an effect of the clock fluctuation has been substantially neutralized. For instance, an effect of the frequency fluctuation 214 of the clock signal 204 can be sufficiently reduced to enable observable delays to be analyzed as being voltage-based delays. By way of an example analogy, the combination operation 226 eliminates the common-mode aspects between the first signal 218-1 and the second signal 218-2 but leaves the differential aspects. As is described below, each signal 218 can be implemented as a multi-bit digital signal. In such implementations, the combination operation 226 can be executed using a difference (e.g., subtraction) operation.

Thus, the combined signal 220 is indicative of the voltage variation 224 of the voltage level 216 of the supply voltage 228. Based on the first signal 218-1, the second signal 218-2, and the combined signal 220, the voltage-variation detection circuitry 106 can detect if a voltage-based attack 212 is occurring using one or more comparison operations and at least one threshold. If a voltage-based attack 212 is detected, the voltage-variation detection circuitry 106 generates a voltage alert signal 108 and provides the voltage alert signal 108 to the protection circuitry 206. In this case, the voltage alert signal 108 is indicative of the voltage level 216 being outside the target voltage range 222. The protection circuitry 206 is coupled to the voltage-variation detection circuitry 106 and accepts the voltage alert signal 108 therefrom. The protection circuitry 206 takes at least one action to protect the apparatus 102 (of FIG. 1) responsive to the voltage level 216 being outside the target voltage range 222. Thus, responsive to the voltage alert signal 108, the protection circuitry 206 performs at least one voltage-variation detection response 110.

The voltage-variation detection response 110 is designed to combat the voltage-based attack 212. The voltage-variation detection response 110 can include logging activity or monitored signals to retain a record of the attack. Moreover, the protection circuitry 206 can act to protect the targeted information, such as the secret key 210. Example protective actions include ceasing cryptographic operations, blocking access to the memory 208, powering down the memory 208, collapsing power in a power domain that includes the memory 208, physically severing access to the secret key 210, deleting or otherwise destroying the secret key 210, and so forth. Although certain components depicted in FIG. 2 (e.g., the voltage-variation detection circuitry 106, the clock generator 202, the memory 208, and the protection circuitry 206) are shown as a single instance of one localized block, each may be realized in multiple instances or as circuitry that is distributed over some portion of the IC 104. For example, different instances of the voltage-variation detection circuitry 106 may be positioned at various locations around the IC 104 to detect localized voltage-based attacks 212.

Figure 3:
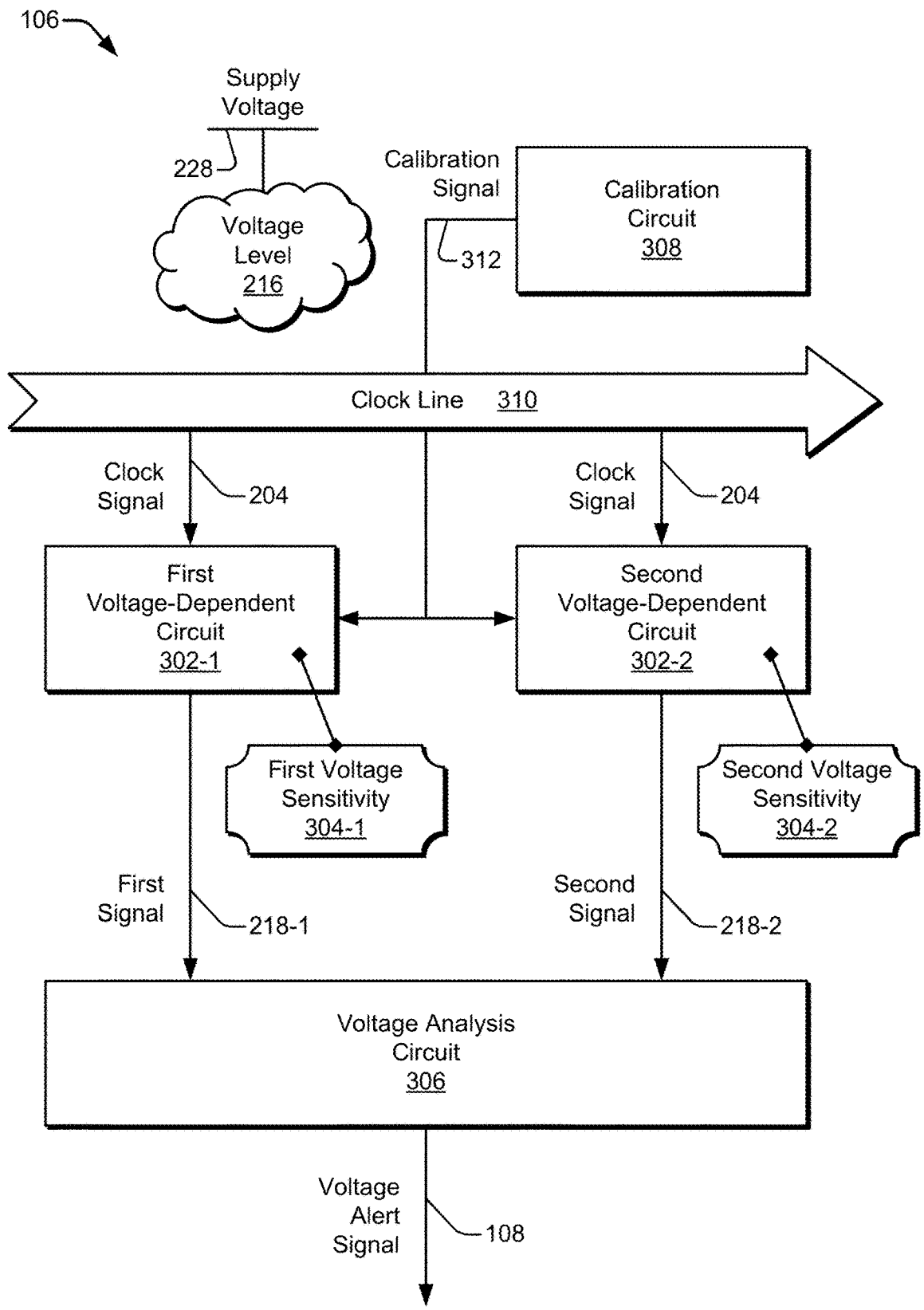
FIG. 3 is a schematic diagram illustrating an example of voltage-variation detection circuitry that includes a first voltage-dependent circuit, a second voltage-dependent circuit, and a voltage-analysis circuit.

FIG. 3 is a schematic diagram illustrating an example of voltage-variation detection circuitry 106 that includes a first voltage-dependent circuit 302-1, a second voltage-dependent circuit 302-2, and a voltage analysis circuit 306. The voltage-variation detection circuitry 106 can also include a calibration circuit 308 and a clock line 310. The clock line 310 can, for example, form a part of a clock tree (not shown) that is coupled to the clock generator 202 (of FIG. 2). The clock line 310 propagates the clock signal 204 and provides the clock signal 204 to the first and second voltage-dependent circuits 302-1 and 302-2. The clock signal 204 may undergo a frequency fluctuation 214 (of FIG. 2) during operation of the first voltage-dependent circuit 302-1 and the second voltage-dependent circuit 302-2. As shown, the voltage level 216 can correspond to the supply voltage 228.

In example implementations, the first voltage-dependent circuit 302-1 and the second voltage-dependent circuit 302-2 are coupled to the clock line 310 to accept the clock signal 204. The first voltage-dependent circuit 302-1 corresponds to a first voltage sensitivity 304-1. The first voltage-dependent circuit 302-1 produces the first signal 218-1 to be indicative of the voltage level 216 responsive to the clock signal 204 and based on the first voltage sensitivity 304-1. The second voltage-dependent circuit 302-2 corresponds to a second voltage sensitivity 304-2. The second voltage-dependent circuit 302-2 produces the second signal 218-2 to be indicative of the voltage level 216 responsive to the clock signal 204 and based on the second voltage sensitivity 304-2.

The first voltage sensitivity 304-1 corresponds to a first propagation speed of the clock signal 204 within at least a portion of the first voltage-dependent circuit 302-1, with the first propagation speed also being responsive to the voltage level 216. The second voltage sensitivity 304-2 corresponds to a second propagation speed of the clock signal 204 within at least a portion of the second voltage-dependent circuit 302-2, with the second propagation speed also being responsive to the voltage level 216. Here, the first propagation speed is different from the second propagation speed based on the different voltage sensitivities. Thus, the production of the first signal 218-1 can include propagating the clock signal 204 at a first propagation speed based on the first voltage sensitivity 304-1. And the production of the second signal 218-2 can include propagating the clock signal 204 at a second propagation speed based on the second voltage sensitivity 304-2. Examples of this signal propagation are described with reference to FIGS. 4 to 6-2.

The voltage analysis circuit 306 is coupled to the first voltage-dependent circuit 302-1 and the second voltage-dependent circuit 302-2. The voltage analysis circuit 306 generates the voltage alert signal 108 based on the first signal 218-1 and the second signal 218-2. For example, the voltage analysis circuit 306 can generate the voltage alert signal 108 based on a combined signal 220 (of FIG. 2) that is computed using a combination of the first signal 218-1 and the second signal 218-2. Examples of generating the voltage alert signal 108 are described with reference to FIGS. 4, 7, and 8.

The calibration circuit 308 can be part of or separate from the voltage-variation detection circuitry 106. As shown, the calibration circuit 308 is coupled to the first and second voltage-dependent circuits 302-1 and 302-2. The calibration circuit 308 generates at least one calibration signal 312 that is provided to the first and second voltage-dependent circuits 302-1 and 302-2. Example approaches to calibration are described with reference to FIGS. 4, 5, and 7.

Figure 4:
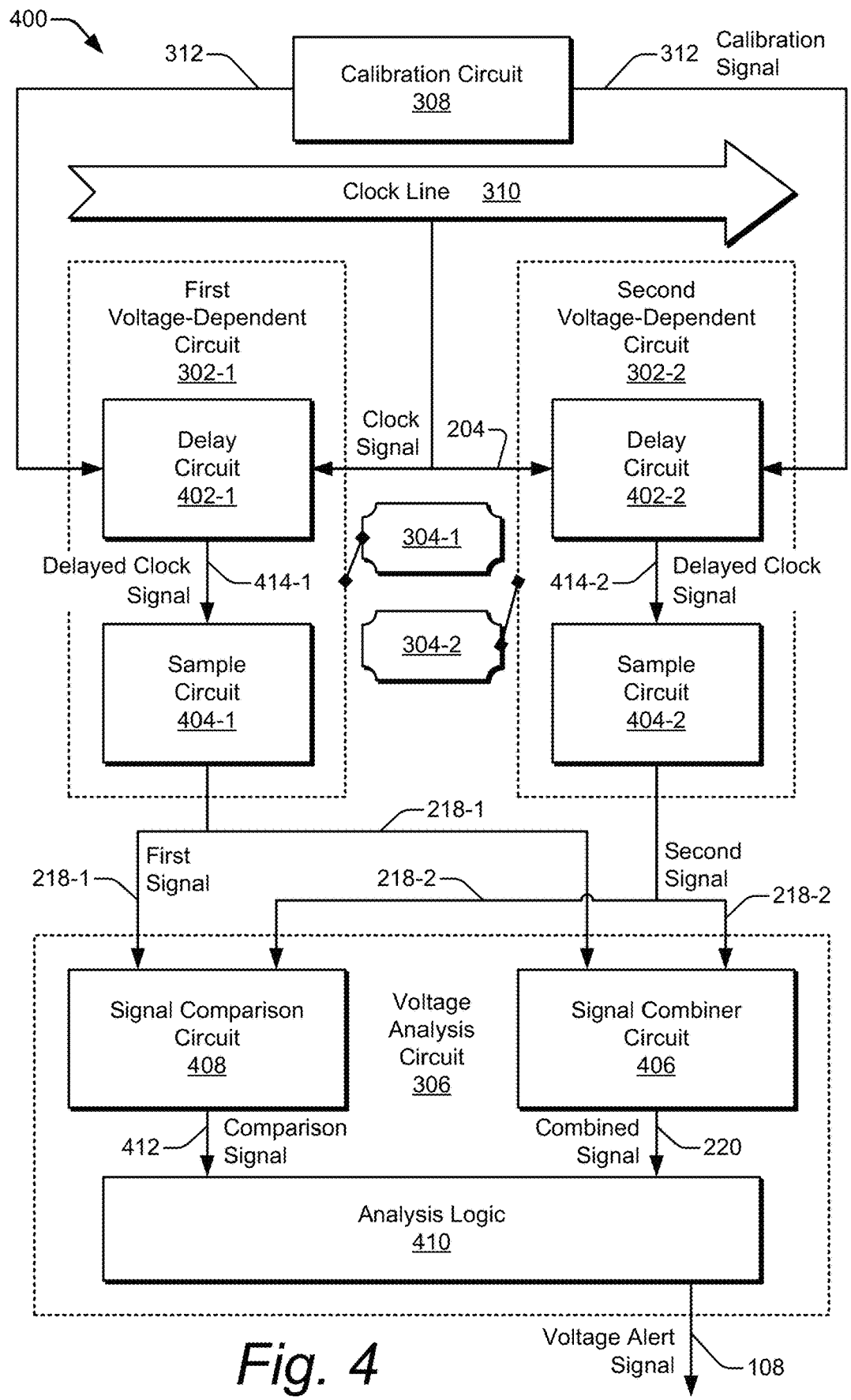
FIG. 4 is a schematic diagram illustrating example aspects of the first voltage-dependent circuit, the second voltage-dependent circuit, and the voltage analysis circuit of FIG. 3.

FIG. 4 is a schematic diagram 400 illustrating example aspects of the first voltage-dependent circuit 302-1, the second voltage-dependent circuit 302-2, and the voltage analysis circuit 306. As shown, each voltage-dependent circuit 302 includes a delay circuit 402 and a sample circuit 404. Specifically, the first voltage-dependent circuit 302-1 includes a delay circuit 402-1 and a sample circuit 404-1. The second voltage-dependent circuit 302-2 includes a delay circuit 402-2 and a sample circuit 404-2. Each delay circuit 402 is coupled to the calibration circuit 308 to receive the calibration signal 312 and is coupled to the clock line 310 to receive the clock signal 204. The voltage analysis circuit 306 includes a signal combiner circuit 406, a signal comparison circuit 408, and analysis logic 410. Each of the signal combiner circuit 406 and the signal comparison circuit 408 can be coupled to both the sample circuit 404-1 and the sample circuit 404-2 directly or indirectly to receive the first and second signals 218-1 and 218-2.

In example implementations, each delay circuit 402 is coupled to the clock line 310 and delays the clock signal 204 to produce a delayed clock signal 414. Each respective sample circuit 404 accepts the delayed clock signal 414 from a respective delay circuit 402. Each sample circuit 404 is coupled between a respective delay circuit 402 and the voltage analysis circuit 306. In operation, each sample circuit 404 samples a respective delayed clock signal 414 across multiple buffered instants to produce the signal 218, which is provided to the voltage analysis circuit 306. In some implementations, each delay circuit 402 produces a delayed clock signal 414 responsive to the clock signal 204 and based on a corresponding voltage sensitivity 304.

Specifically, the delay circuit 402-1 produces the delayed clocked signal 414-1, and the delay circuit 402-2 produces the delayed clocked signal 414-2. Further, the sample circuit 404-1 is coupled between the delay circuit 402-1 and the voltage analysis circuit 306, and the sample circuit 404-1 samples the delayed clock signal 414-1 to produce the first signal 218-1. Similarly, the sample circuit 404-2 is coupled between the delay circuit 402-2 and the voltage analysis circuit 306, and the sample circuit 404-2 samples the delayed clock signal 414-2 to produce the second signal 218-2.

The voltage sensitivity 304 can be realized using, for example, a transistor with a particular threshold voltage. In such cases, one or more first transistors of the first voltage-dependent circuit 302-1 can have a first threshold voltage to realize the first voltage sensitivity 304-1. Similarly, one or more second transistors of the second voltage-dependent circuit 302-2 can have a second threshold voltage to realize the second voltage sensitivity 304-2. Such transistors can be included as part of a delay circuit 402, as part of a sample circuit 404, or as part of both a delay circuit 402 and a sample circuit 404 of each of the first and second voltage-dependent circuits 302-1 and 302-2.

The voltage analysis circuit 306 accepts the first signal 218-1 from the sample circuit 404-1 of the first voltage-dependent circuit 302-1 and the second signal 218-2 from the sample circuit 404-2 of the second voltage-dependent circuit 302-2. The signal combiner circuit 406 combines the first signal 218-1 and the second signal 218-2 to produce a combined signal 220. The analysis logic 410 can generate the voltage alert signal 108 based on the combined signal 220. The signal comparison circuit 408 compares at least the first signal 218-1 and the second signal 218-2 to produce at least one comparison signal 412 that is indicative of a relative delay size (e.g., delay length or delay period) between the first signal 218-1 and the second signal 218-2. Additionally or alternatively, the signal comparison circuit 408 can compare the combined signal 220 to at least one threshold to produce another comparison signal 412. The analysis logic 410 can generate the voltage alert signal 108 based on the at least one comparison signal 412. Generally, the analysis logic 410 can generate the voltage alert signal 108 based on at least one comparison signal 412, the combined signal 220, and at least one voltage threshold. Example operations of the voltage analysis circuit 306, including the analysis logic 410, are described below with reference to FIGS. 7 and 8.

In some implementations, the calibration circuit 308 operates to calibrate the voltage-variation detection circuitry 106 after fabrication of an IC 104 on a per-chip basis. The calibration signal 312 sets a programmable delay amount of the delay circuit 402. Example approaches for calibration are described below with reference to FIG. 7. Calibration can include establishing a quantity of delay units of the delay circuit 402 through which the clock signal 204 propagates to produce the delayed clock signal 414. The establishing can include controlling a multiplexer, which is depicted in FIG. 5.

Figure 5:
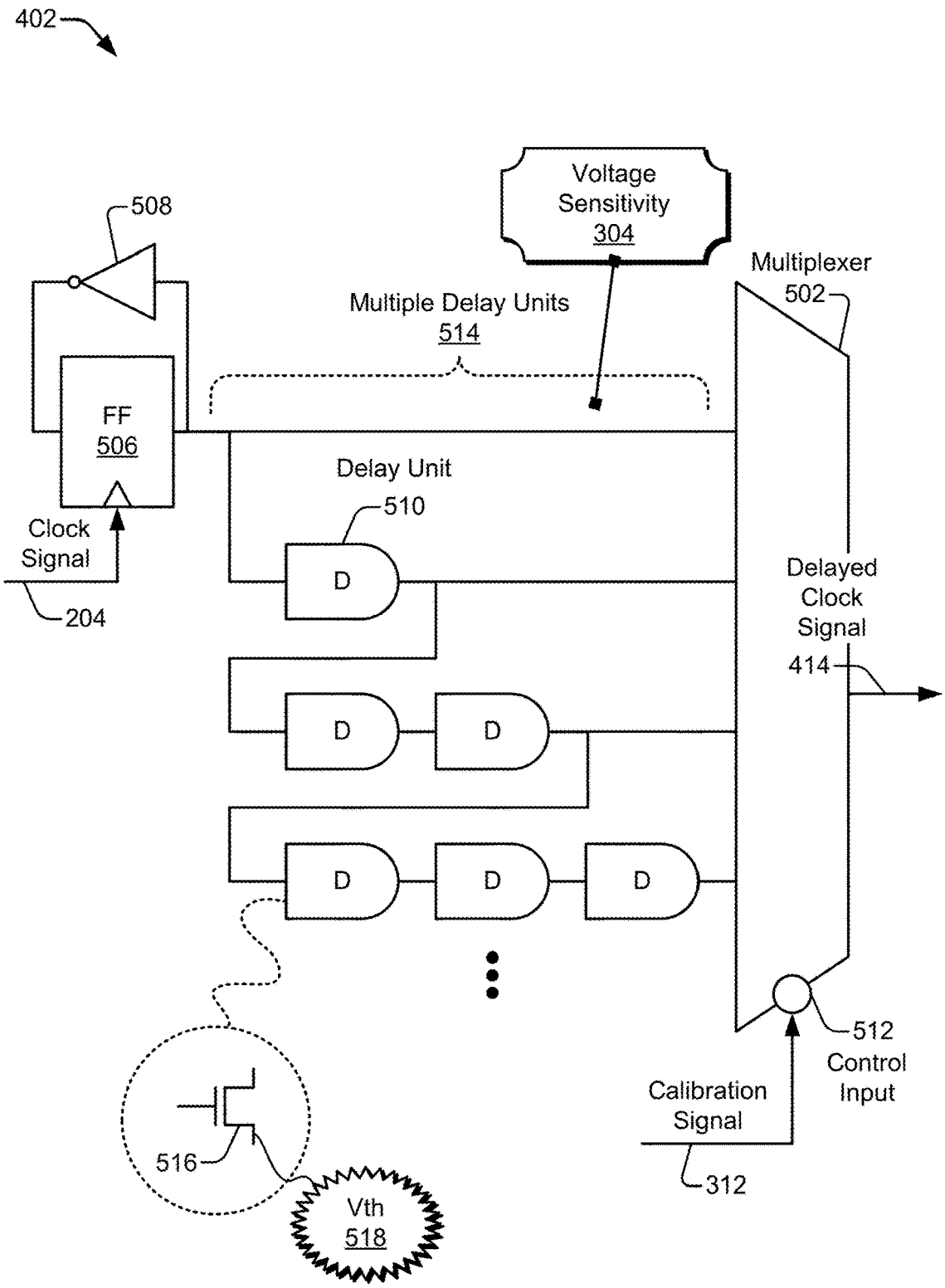
FIG. 5 is a circuit diagram illustrating an example delay circuit of a voltage-dependent circuit.

FIG. 5 is a circuit diagram illustrating an example delay circuit 402 of a voltage-dependent circuit 302 (e.g., of FIGS. 3 and 4). As shown, the delay circuit 402 includes multiple delay units 514 and at least one multiplexer 502. The multiple delay units 514 can provide a particular voltage sensitivity 304, as is described below. The delay circuit 402 also includes an inverter 508 and a flip-flop 506 (FF 506) having an input terminal, an output terminal, and a clocking terminal. The inverter 508 is coupled across the output terminal and the input terminal of the flip-flop 506. The clocking terminal of the flip-flop 506 is coupled to the clock line 310 (e.g., of FIGS. 3 and 4) to receive the clock signal 204. The flip-flop 506 can launch a pulse or an edge thereof at the output terminal of the flip-flop 506 responsive to the clock signal 204, such as at each cycle of the clock signal 204.

In example implementations, the multiplexer 502 includes multiple input terminals, at least one output terminal, and at least one control input 512. The multiple delay units 514 are coupled between the output terminal of the flip-flop 506 and the multiple input terminals of the multiplexer 502. At least a portion of the multiple delay units 514 are coupled together in series and include multiple instances of a delay unit 510. Each delay unit 510 can be realized as, for example, an inverter, a NAND gate with shorted inputs, and so forth. Each delay unit 510 can institute a delay of a same length as other delay units or a delay having a length that varies from other delay units. As shown, each delay unit 510 can include at least one transistor 516 that has or corresponds to a threshold voltage 518 (Vth 518). The threshold voltage 518 can at least partially determine how quickly an edge triggers the delay unit 510 and therefore a propagation speed of the clock signal edge traveling through at least a portion of the multiple delay units 514.

In example operations, the flip-flop 506 launches an edge into the multiple delay units 514 responsive to the clock signal 204. A length of a path traveled by the edge can be programmed using the multiplexer 502 to establish a programmable delay amount. Different paths can include different quantities of delay units 510 to thereby establish a delay size, such as a delay period or length. In FIG. 5, the multiplexer 502 includes four input terminals. However, a multiplexer 502 can have a different quantity of input terminals. A top input terminal of the multiplexer 502 is coupled to a path without a delay unit 510, and a bottom input terminal is coupled to a path with five delay units 510. Two middle input terminals are coupled to two paths with one or three delay units 510. After propagating through one or more delay units 510 of the multiple delay units 514, the clock signal 204 is transformed into the delayed clock signal 414. To program the delay amount, a particular input terminal of the multiplexer 502 can be selectively coupled to the output terminal of the multiplexer 502 using the control input 512.

In some cases, the calibration signal 312 is coupled to the control input 512 to select the input terminal of the multiplexer 502 for coupling to the output terminal thereof. Because this programs a delay period for the delayed clock signal 414, the calibration circuit 308 (e.g., of FIGS. 3 and 4) can be used to establish the delay period during calibration. A value or setting of the control input 512 can be fused to a single set of bits or at least one selected switch during a calibration procedure and then used during the life of the IC 104. Regardless of calibration approach, a propagating edge of the clock signal 204 that has been delayed by some quantity of delay units 510 of the multiple delay units 514 is selected based on the control input 512, and the multiplexer 502 forwards edges of the selected signal as the delayed clock signal 414.

Although one particular implementation of the delay circuit 402 is depicted in FIG. 5, the delay circuit 402 can be implemented in alternative manners. For example, the multiple delay units 514 can include a different quantity of delay units 510. The granularity between two "adjacent" paths can be a single delay unit 510 or multiple delay units 510. Each delay unit 510 may have a same delay length or a different delay length as compared to other delay units 510. One or more delay units 510 may or may not be capable of being used in more than one path (e.g., may be used or available for use in multiple different paths as shown). A delay circuit 402 can include multiple multiplexers that jointly establish a delay period responsive to the calibration signal 312. Further, delay units 510 can be grouped into different granularities of delay periods, such as coarse, medium, and fine. With, for instance, three multiplexers that can each select between four delay lengths in each of three different delay granularities that are coupled together in series, 64 different delay periods (4×4×4=64) are available for programming during the calibration procedure.

Figures 1, 6:
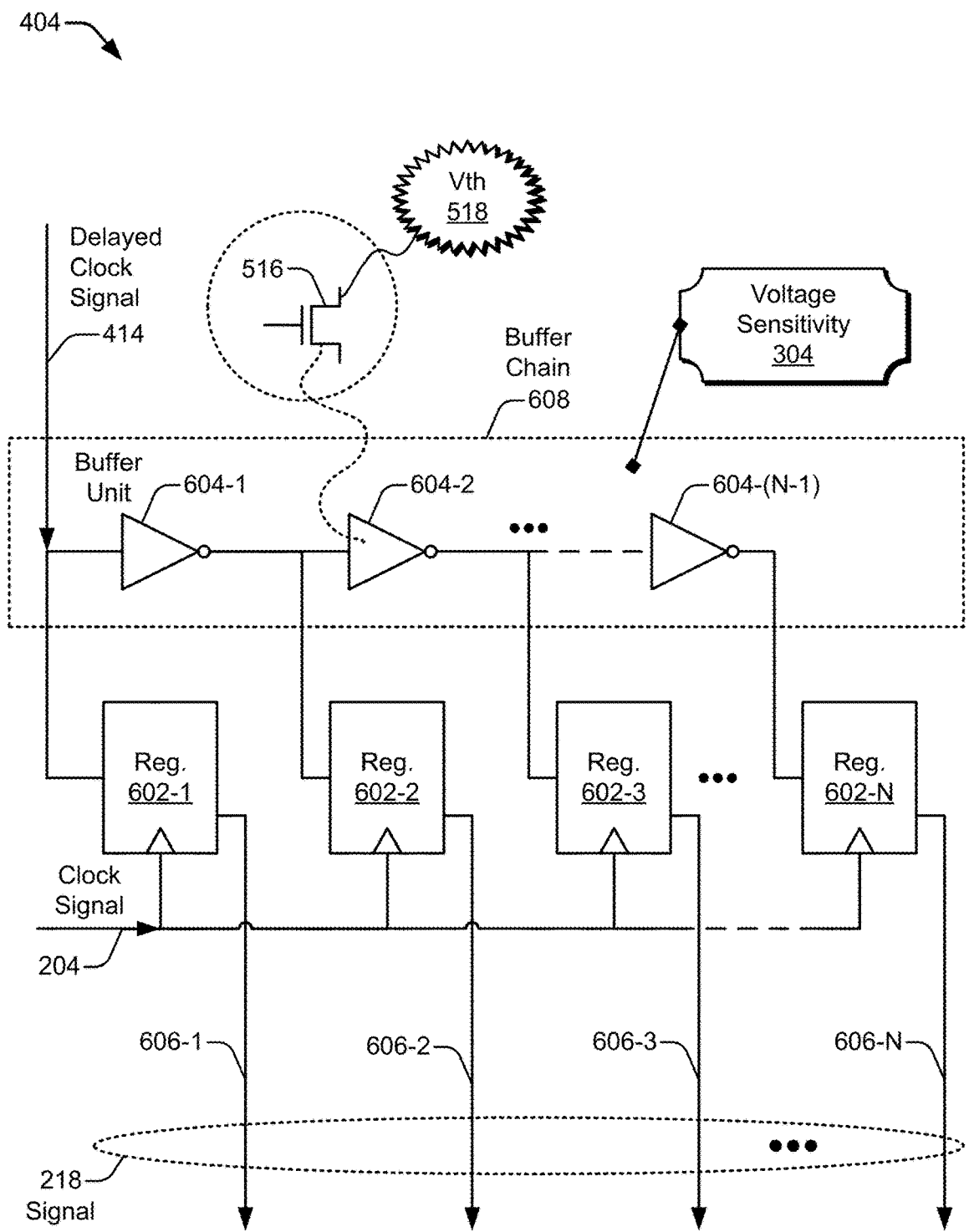
Figures 2, 6:
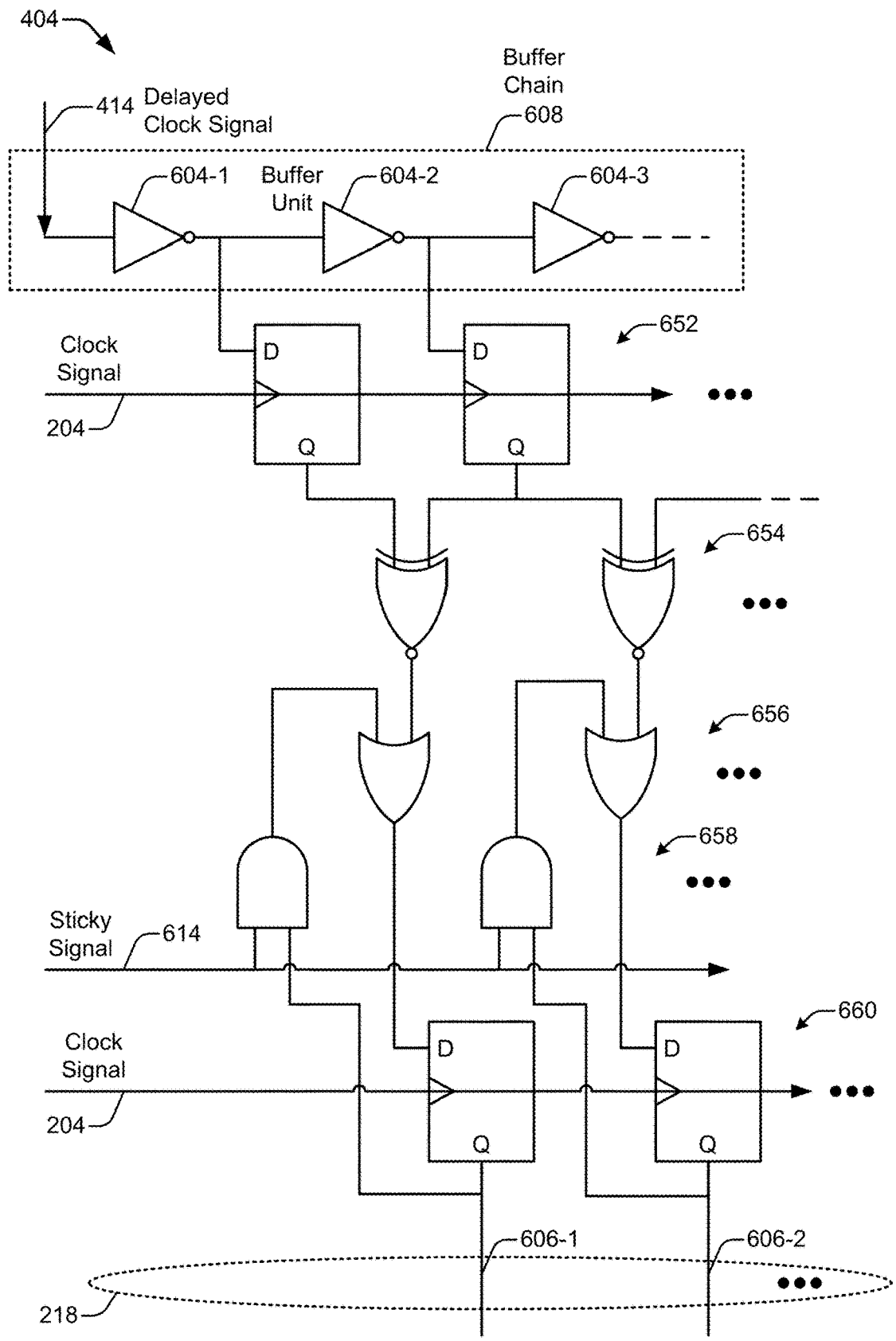

FIG. 6-1 is a circuit diagram illustrating an example sample circuit 404 of a voltage-dependent circuit 302 (e.g., of FIGS. 3 and 4). As shown, the sample circuit 404 includes a buffer chain 608 and multiple register units 602-1, 602-2, 602-3, . . . , 602-N. The buffer chain 608 can provide a voltage sensitivity 304, as is described below. The buffer chain 608 includes multiple buffer units 604-1, 604-2, . . . , 604-(N−1) that are coupled together in series. The variable "N" represents a positive integer. Each register unit 602 includes an input terminal, an output terminal, and a clocking terminal. The clocking terminal of each register unit 602 is coupled to the clock signal 204. Each register unit 602 stores, for instance, one digital bit and can be implemented as, for example, a latch of any type, a flip-flop of any type (e.g., a "D" flip-flop), and so forth.

In example implementations, each respective register unit 602 of the multiple register units 602-1 . . . 602-N corresponds to or is coupled to a respective buffer unit 604 of the buffer chain 608. Each buffer unit 604 can be realized as, for instance, an inverter. As shown, each buffer unit 604 can include at least one transistor 516 that has or corresponds to a threshold voltage 518 (Vth 518). The threshold voltage 518 can at least partially determine how quickly an edge triggers a buffer unit 604 and therefore a propagation speed of the edge of the delayed clock signal 414 traveling through the buffer chain 608.

In example operations, an initial buffer unit 604-1 of the buffer chain 608 accepts the delayed clock signal 414 from the delay circuit 402, such as from the multiplexer 502 thereof. The delayed edge of the delayed clock signal 414 propagates along the buffer chain 608 from one buffer unit 604 to the next such that the multiple buffer units 604-1, 604-2, . . . , 604-(N−1) jointly produce multiple buffered versions of the delayed clock signal 414. An output of each respective buffer unit 604 is provided to an input terminal of each respective register unit 602. This enables the multiple register units 602-1 . . . 602-N to sample the signaling present along the buffer chain 608 and therefore determine where along the buffer chain 608 the delayed edge is present when the clock signal 204 transitions. The multiple register units 602-1 . . . 602-N can therefore jointly latch the multiple buffered versions of the delayed clock signal 414 to produce the signal 218. The multiple sampled digital values 606-1, 606-2, 606-3, . . . , 606-N are provided at respective output terminals of the multiple register units 602-1, 602-2, 602-3, . . . , 602-N as the signal 218. Example digital versions of the signal 218 are described below with reference to FIG. 7.

Although depicted in a particular manner, the sample circuit 404 can be implemented differently. For example, a quantity of buffer units 604 of the buffer chain 608 can be "N," such as if an output of the initial buffer unit 604-1 is coupled to the input terminal of the initial register unit 602-1. Further, additional circuit devices can be employed to sample the outputs of the multiple buffer units 604-1 . . . 604-(N−1) along the buffer chain 608. An example with both alternatives is illustrated in FIG. 6-2.

FIG. 6-2 is a circuit diagram illustrating another example sample circuit 404 of a voltage-dependent circuit 302 (e.g., of FIGS. 3 and 4). In this example, each register unit 602 (of FIG. 6-1) is realized as a D flip-flop and is organized into two rows. A first row of D flip-flops 652 accepts digital values from the buffer chain 608 responsive to the clock signal 204. A row of exclusive NOR gates 654 receives values output from the first row of D flip-flops 652 to identify one or more locations along the buffer chain 608 at which adjacent digital values are identical. A row of OR gates 656 provides a bridge between the row of exclusive NOR gates 654 and a second row of D flip-flops 660.

To counteract possible sticky bits, the outputs of a row of AND gates 658 are coupled to inputs of the row of OR gates 656. The row of AND gates 658 operate responsive to a sticky signal 614. Outputs of the row of OR gates 656 are coupled to input terminals of the second row of D flip-flops 660. The OR gates of the row of OR gates 656 forward the digital values present along the buffer chain 608 as modified by the row of exclusive NOR gates 654. This enables the second row of D flip-flops 660 to sample the signaling along the buffer chain 608 and therefore determine where along the buffer chain 608 the delayed edge is present when the clock signal 204 transitions. The multiple sampled digital values 606-1, 606-2, . . . , 606-N (also of FIG. 6-1) are provided at respective output terminals of the D flip-flops of the second row of D flip-flops 660 as the signal 218. Example digital versions of the signal 218 are described next with reference to FIG. 7.

Figure 7:
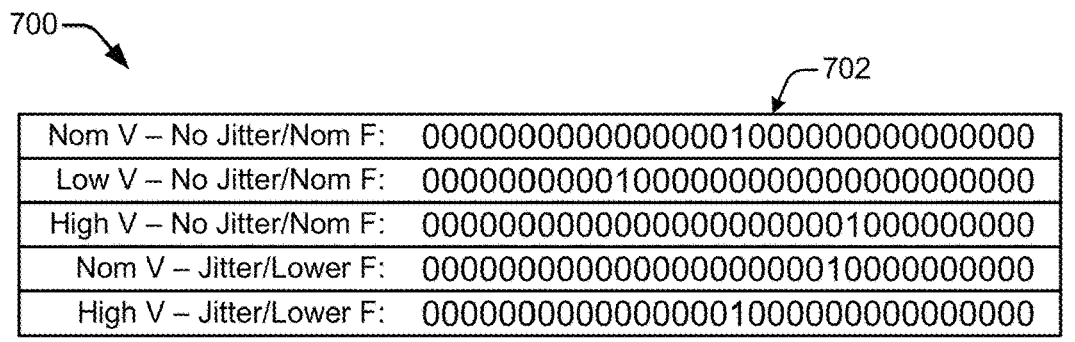
FIG. 7 depicts an example scheme for voltage-variation detection under clock fluctuations.
Figure 7:
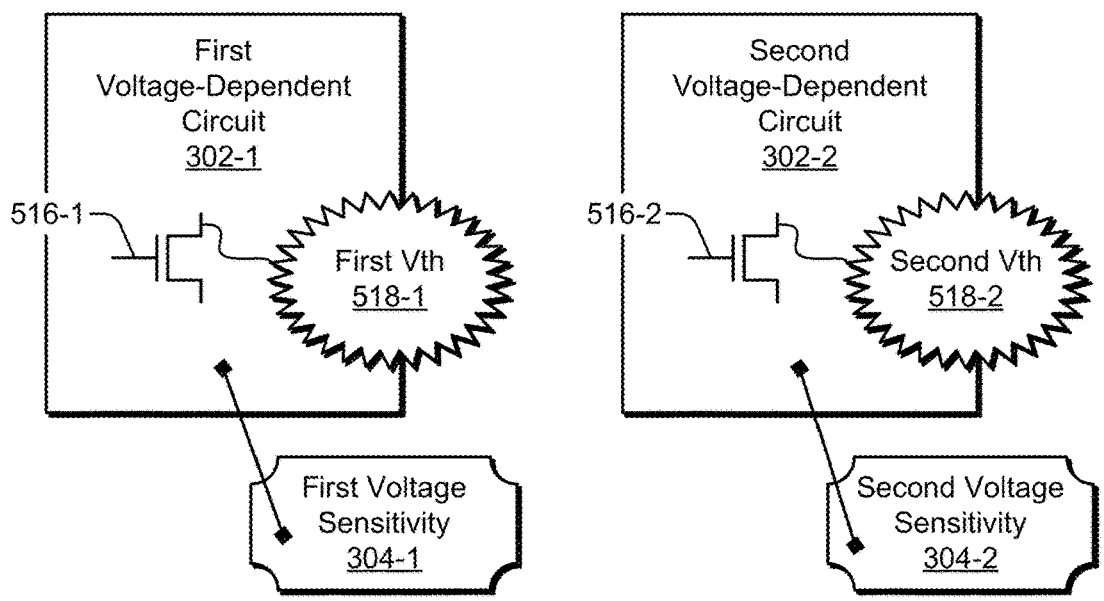
Figure 7:
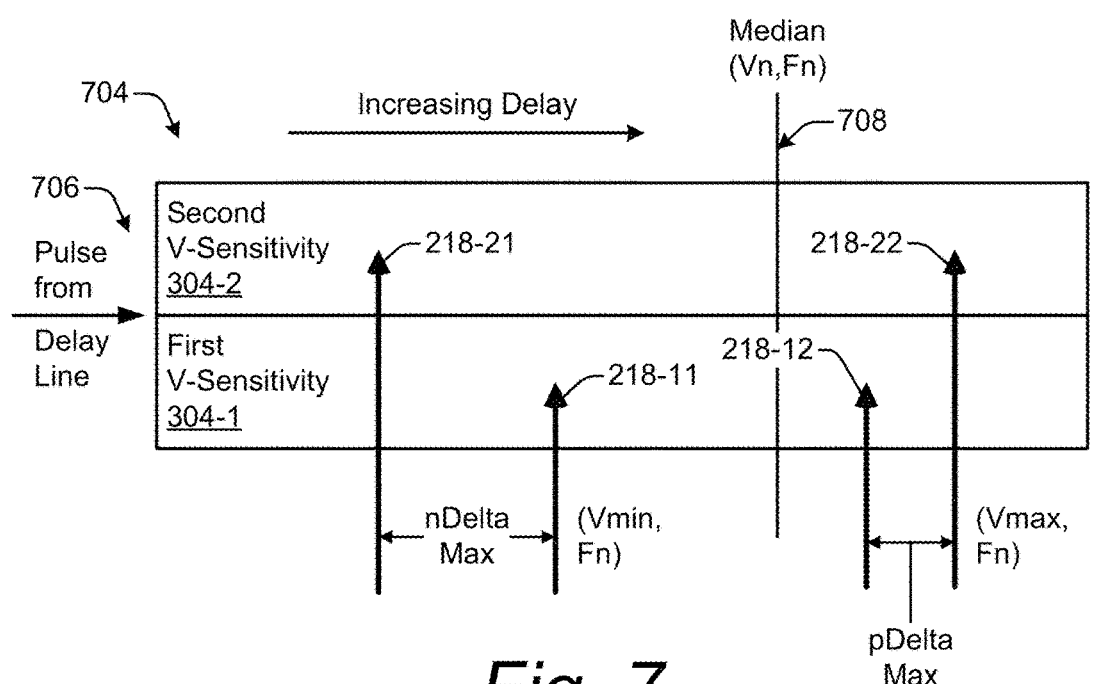

FIG. 7 depicts an example scheme 700 for voltage-variation detection under clock fluctuations. A collection 702 of sampled digital values for the signal 218 (e.g., of FIGS. 6-1 and 6-2) is illustrated at the top of FIG. 7. A first row of the collection 702 corresponds to a nominal voltage level with a nominal frequency under no clock jitter. Due to one approach to calibration, the "1" digital value is centered along the signal 218. The second and third rows of the collection 702 reflect a voltage-based delay component in the signal 218. A second row of the collection 702 corresponds to a low voltage level under no clock jitter. Due to the lower voltage level, signal propagation is slower. Consequently, the "1" digital value has not reached the center position along the signal 218 when the digital values along the buffer chain 608 (of FIGS. 6-1 and 6-2) are sampled by the multiple register units 602-1 . . . 602-N (also of FIGS. 6-1 and 6-2). A third row of the collection 702 corresponds to a high voltage level under no clock jitter. Due to the higher voltage level, signal propagation is faster. Consequently, the "1" digital value has passed beyond the center position along the signal 218 when the digital values along the buffer chain 608 are sampled by the multiple register units 602-1 . . . 602-N.

The fourth row of the collection 702 reflects a frequency-based delay characteristic in the signal 218. The fourth row of the collection 702 corresponds to a nominal voltage level under clock jitter with a lower frequency. Due to the lower clock frequency, the edge has more time to propagate along the buffer chain 608 before the clock signal causes the digital values to be sampled. Consequently, the "1" digital value has passed beyond the center position along the signal 218 when the digital values along the buffer chain 608 are sampled by the multiple register units 602-1 . . . 602-N. Because the third and fourth rows produce similar values for the signal 218 under different operating parameters, it is difficult to identify the source of the temporal or positional deviation of the propagating edge.

The fifth row of the collection 702 reflects both a voltage-based delay component and a frequency-based delay characteristic in the signal 218. The fifth row of the collection 702 corresponds to a high voltage level under clock jitter with a lower frequency. Due to an interaction between the higher voltage and the lower clock frequency, the edge could be at any of many possible positions, even after appropriate calibration. As depicted by way of example, the "1" digital value is approximately centered along the signal 218 when the digital values along the buffer chain 608 are sampled by the multiple register units 602-1 . . . 602-N. Because the first and fifth rows produce similar values for the signal 218 under different operating parameters, it is difficult to identify the cause of the temporal deviation of the propagating edge, or even if there is or should be a deviation as in this case. Although the edge is represented by a single digital value (e.g., a "1") in FIG. 7, the edge may be represented by a different digital value (e.g., a "0") or by multiple values in silicon due to possible metastability (e.g., a "1101" or a "1001" may represent an edge in a long buffer chain 608).

To resolve at least some of the ambiguity resulting from the potential presence of both a voltage-based delay component and a frequency-based delay characteristic, first and second signals are respectively produced using first and second sets of digital devices with different first and second voltage sensitivities. The first and second voltage-dependent circuits 302-1 and 302-2 are depicted in the middle of FIG. 7. The first voltage-dependent circuit 302-1 includes some digital devices with the first voltage sensitivity 304-1. For example, one or more first transistors 516-1 can have a first threshold voltage 518-1. These first transistors 516-1 can be included in the delay units 510 of the multiple delay units 514 of the delay circuit 402 (of FIG. 5), in the buffer units 604 of the buffer chain 608 of the sample circuit 404 (of FIGS. 6-1 and 6-2), or in both. The second voltage-dependent circuit 302-2 includes some digital devices with the second voltage sensitivity 304-2. For example, one or more second transistors 516-2 can have a second threshold voltage 518-2. These second transistors 516-2 can be included in the delay units 510 of the multiple delay units 514 of the delay circuit 402, in the buffer units 604 of the buffer chain 608 of the sample circuit 404, or in both. However, calibration is more straightforward if the transistors 516 having differing voltage sensitivities 304 are present in the delay units 510 of the multiple delay units 514 of the delay circuit 402. Each of the transistors 516 can be implemented as, for example, a field-effect transistor (FET), such as a metal-oxide-semiconductor FET (MOSFET).

A graph 704 is depicted at the bottom of FIG. 7. The graph 704 logically represents two buffer chains 608 of two sample circuits 404 and depicts increasing delay along a horizontal axis from left to right. A pulse from a delay line (e.g., including multiple delay units 514 of FIG. 5) of a delay circuit 402 is input on the left at 706 and traverses along the buffer chain 608 of the respective sample circuit 404 in a rightward direction of the graph 704. Along a vertical axis, the lower half corresponds to digital devices with a first voltage sensitivity 304-1, and the upper half corresponds to digital devices with a second voltage sensitivity 304-2. In this example, the first voltage sensitivity 304-1 corresponds to a relatively lower voltage level, and the second voltage sensitivity 304-2 corresponds to a relatively higher voltage level. For instance, the first threshold voltage 518-1 can be lower than the second threshold voltage 518-2. A baseline or median point with a nominal voltage (Vn) and a nominal frequency (Fn) is indicated by a median line 708.

Four delays are indicated by four signals 218: a first signal 218-11, another first signal 218-12, a second signal 218-21, and another second signal 218-22. There are tendencies pertaining to increasing a voltage level versus decreasing a voltage level and pertaining to the first voltage sensitivity 304-1 versus the second voltage sensitivity 304-2. Generally, variations in voltage level result in a more pronounced delay with the second voltage sensitivity 304-2 with the relatively higher voltage level in comparison to the first voltage sensitivity 304-1 with the relatively lower voltage level. Thus, the second signals 218-21 and 218-22 deviate farther from the median line 708 than to do the first signals 218-11 and 218-12. Also, voltage variations that lower a voltage level produce a more pronounced delay change than do voltage variations that increase a voltage level. Thus, the first signal 218-11 and the second signal 218-21 that result from a voltage variation to a minimum voltage (Vmin) are displaced farther from the median line 708 than are the first signal 218-12 and the second signal 218-22 that result from a voltage variation to a maximum voltage (Vmax).

These tendencies enable the analysis logic 410 (of FIG. 4) to determine if a voltage is being varied. Additionally, these tendencies enable the analysis logic 410 to identify a voltage variation as being positive or negative relative to a nominal voltage level. To do so, the analysis logic 410 also uses two delta thresholds for a difference between the two first and second signals 218-1 and 218-2: a negative delta threshold (nDelta Max) and a positive delta threshold (pDelta Max). Example analysis processes using these signals and thresholds to determine a voltage variation are described below with reference to FIG. 8.

The voltage-variation detection circuitry 106 (e.g., of FIG. 3) can be calibrated to compensate for process variations during fabrication, which variations can appreciably impact a degree of voltage sensitivity 304. To perform a calibration procedure, the calibration circuit 308 determines a setting of the delay circuit 402 to establish an appropriate median point along a buffer chain 608 for a nominal voltage. To do so, the calibration circuit 308 considers a quantity of buffer units 604 of the multiple buffer units 604-1 to 604-(N−1) of the buffer chain 608, a nominal voltage level (Vnom), and a target voltage range 222 (of FIG. 2) that can correspond to the minimum voltage (Vmin) and the maximum voltage (Vmax). In operation, the calibration circuit 308 tests different programmable delay amounts that can be provided by changing the setting of the multiplexer 502 of the delay circuit 402 within the target voltage range 222. The median line 708, where an edge reaches under nominal conditions, may not be positioned at the center along the buffer chain 608 to accommodate the tendency of voltages below the nominal voltage to impact the delay more than do voltages above the nominal voltage.

Having generally described schemes, techniques, and hardware for voltage-variation detection under clock fluctuations, this discussion now turns to example methods.

Example Methods for Voltage-Variation Detection Under Clock Fluctuations

Example methods are described below with reference to the flow diagrams of FIGS. 8 and 9. Aspects of these methods may be implemented in, for example, hardware (e.g., fixed logic circuitry or a processor in conjunction with a memory), firmware, or some combination thereof. The processes may be realized using one or more of the apparatuses or components shown in FIGS. 1 to 6-2, which components may be further divided, combined, and so on. The devices and components of these figures generally represent firmware; hardware, such as user or server devices, packaged modules, IC chips, or circuits; or a combination thereof. Thus, these figures illustrate some of the many possible systems or apparatuses capable of implementing the described methods.

For these flow diagrams, the orders in which operations are shown and/or described are not intended to be construed as a limitation. Any number or combination of the described method operations can be combined in any order to implement a given method, or an alternative method. Operations may also be omitted or added to the described methods. Further, described operations can be implemented in fully or partially overlapping manners. Although the two flow diagrams are described separately, their operations may be interrelated. For example, one or more of the operations depicted in FIG. 8 may be performed as part of the operation(s) for block 908 of FIG. 9.

Figure 8:
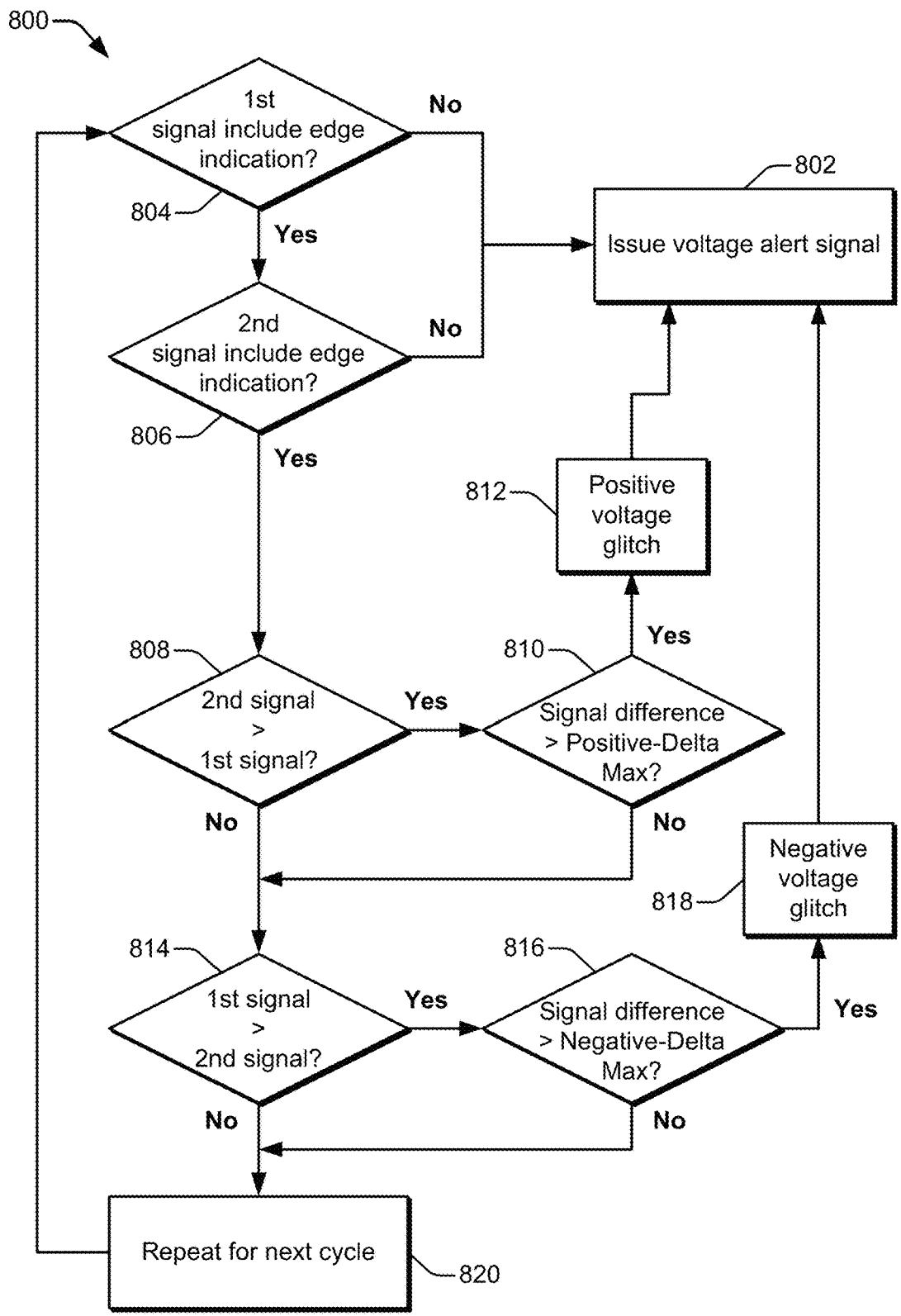
FIG. 8 illustrates example methods for an apparatus to implement voltage-variation detection under clock fluctuations.

FIG. 8 illustrates, with a flow diagram 800, example methods for an apparatus to implement voltage-variation detection under clock fluctuations. The operations of the flow diagram 800 can be performed by, for example, the analysis logic 410 of the voltage analysis circuit 306 of the voltage-variation detection circuitry 106 (e.g., of FIGS. 2-4). At 804, the analysis logic 410 determines if the first signal 218-1 includes at least one edge indication (e.g., one or a few digits that differ from the other digits). If not, then at 802 the analysis logic 410 of the voltage-variation detection circuitry 106 issues a voltage alert signal 108. If so, then at 806 the analysis logic 410 determines if the second signal 218-2 includes at least one edge indication. If not, then at 802 the analysis logic 410 issues a voltage alert signal 108. On the other hand, if both the first and second signals 218-1 and 218-2 have at least one edge indication (as determined at 804 and 806), the flow diagram 800 continues at 808.

At 808, the analysis logic 410 determines if the second signal 218-2 has a greater delay than the first signal 218-1. If so, then at 810 the analysis logic 410 determines if a signal difference between the first and second signals 218-1 and 218-2 is greater than a positive delta threshold ("positive-delta max"). Here, the combined signal 220 (of FIGS. 2 and 4) is realized as a difference signal or set of digital values, and a combination operation 226 (of FIG. 2) is implemented as a difference operation. If the signal difference is greater than the positive delta threshold, then at 812 the analysis logic 410 determines that a positive voltage glitch has occurred. In other words, the analysis logic 410 determines that the voltage level 216 has exceeded a high side of the target voltage range 222. Accordingly, at 802, the analysis logic 410 of the voltage-variation detection circuitry 106 issues a voltage alert signal 108. The voltage alert signal 108 can provide a general indication of a voltage glitch or a specific indication of a positive voltage glitch.

If either determination at 808 or 810 is negative (e.g., the second signal 218-2 is not delayed more than the first signal 218-1 or the signal difference does not exceed the positive delta threshold), then the flow diagram 800 continues at 814. At 814, the analysis logic 410 determines if the first signal 218-1 has a greater delay than the second signal 218-2. If so, then at 816 the analysis logic 410 determines if a signal difference between the first and second signals 218-1 and 218-2 is greater than a negative delta threshold ("negative-delta max"). If the signal difference is greater than the negative delta threshold, then at 818 the analysis logic 410 determines that a negative voltage glitch has occurred. In other words, the voltage level 216 has exceeded, or fallen below, a low side of the target voltage range 222. Accordingly, at 802, the analysis logic 410 issues a voltage alert signal 108. The voltage alert signal 108 can provide a general indication of a voltage glitch or a specific indication of a negative voltage glitch.

A voltage alert signal 108 can additionally or alternatively report a computed voltage level, such as one calculated using interpolation or a lookup table. After 802, the flow diagram 800 can continue at 804 if protective action by the protection circuitry 206 does not include stopping the operation of the voltage-variation detection circuitry 106. Further, if either determination at 814 or 816 is negative (e.g., the first signal 218-1 does not have a greater delay than does the second signal 218-2 or the signal difference does not exceed the negative delta threshold), then the flow diagram 800 repeats for the next cycle as indicated at 820, starting at 804.

Figure 9:
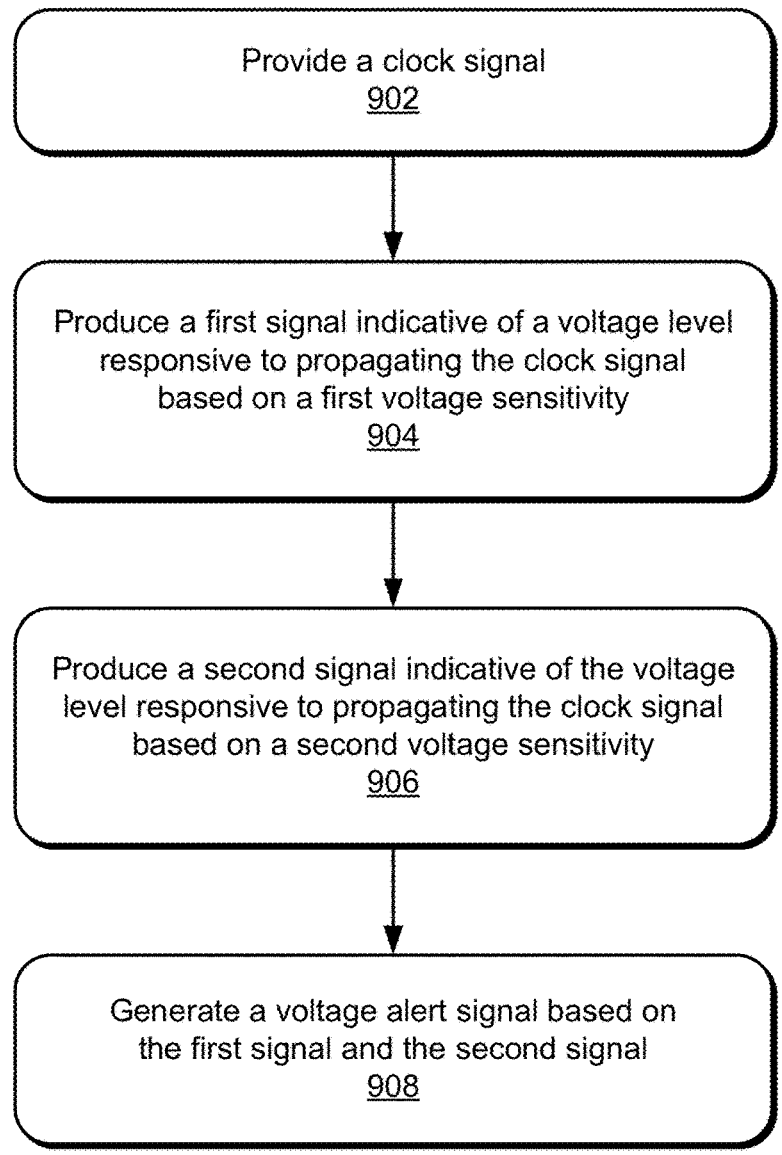
FIG. 9 illustrates other example methods for an apparatus to implement voltage-variation detection under clock fluctuations.

FIG. 9 illustrates, with a flow diagram 900, other example methods for an apparatus to implement voltage-variation detection under clock fluctuations. At 902, a clock signal is provided. For example, voltage-variation detection circuitry 106 can provide a clock signal 204. In some cases, a clock generator 202 of an IC chip 104 can generate the clock signal 204, and a clock tree can route the clock signal 204 to a clock line 310 that is part of the voltage-variation detection circuitry 106. For security purposes, at least the clock signal 204 that propagates along the clock line 310 may be intentionally "jittered" to create a frequency fluctuation 214.

At 904, a first signal indicative of a voltage level is produced responsive to propagating the clock signal based on a first voltage sensitivity. For example, the voltage-variation detection circuitry 106 can produce a first signal 218-1 indicative of a voltage level 216 responsive to propagating the clock signal 204 based on a first voltage sensitivity 304-1. For instance, a delay circuit 402-1 of a first voltage-dependent circuit 302-1 may propagate the clock signal 204 over some quantity of delay units 510 of multiple delay units 514. At least one of the delay units 510 may be constructed with a transistor 516-1 having a first threshold voltage 518-1 to realize the first voltage sensitivity 304-1.

At 906, a second signal indicative of the voltage level is produced responsive to propagating the clock signal based on a second voltage sensitivity. For example, the voltage-variation detection circuitry 106 can produce a second signal 218-2 indicative of the voltage level 216 responsive to propagating the clock signal 204 based on a second voltage sensitivity 304-2. To do so, a delay circuit 402-2 of a second voltage-dependent circuit 302-2 may propagate the clock signal 204 over some quantity of delay units 510 of multiple delay units 514. At least one of the delay units 510 may be constructed with a transistor 516-2 having a second threshold voltage 518-2 to realize the second voltage sensitivity 304-2.

At 908, a voltage alert signal is generated based on the first signal and the second signal. For example, the voltage-variation detection circuitry 106 can generate a voltage alert signal 108 based on the first signal 218-1 and the second signal 218-2. Here, a voltage analysis circuit 306 may generate the voltage alert signal 108 based on a combined signal 220 that is computed using the first and second signals 218-1 and 218-2 and on one or more comparison operations including these signals and at least one threshold. Example comparison operations are described above with reference to FIG. 8 at 808, 810, 814, and 816.

In some implementations, the production of the first signal 218-1 can include delaying the clock signal 204 by a first delay amount (e.g., that is established by a programmable delay amount of a first delay circuit 402-1 of a first voltage-dependent circuit 302-1) to produce a first delayed clock signal 414-1 and sampling the first delayed clock signal 414-1 at multiple different instances (e.g., different buffered versions thereof) to produce the first signal 218-1. Further, the production of the second signal 218-2 can include delaying the clock signal 204 by a second delay amount to produce a second delayed clock signal 414-2 and sampling the second delayed clock signal 414-2 at multiple different instances to produce the second signal 218-2.

Example Electronic Device

Figure 10:
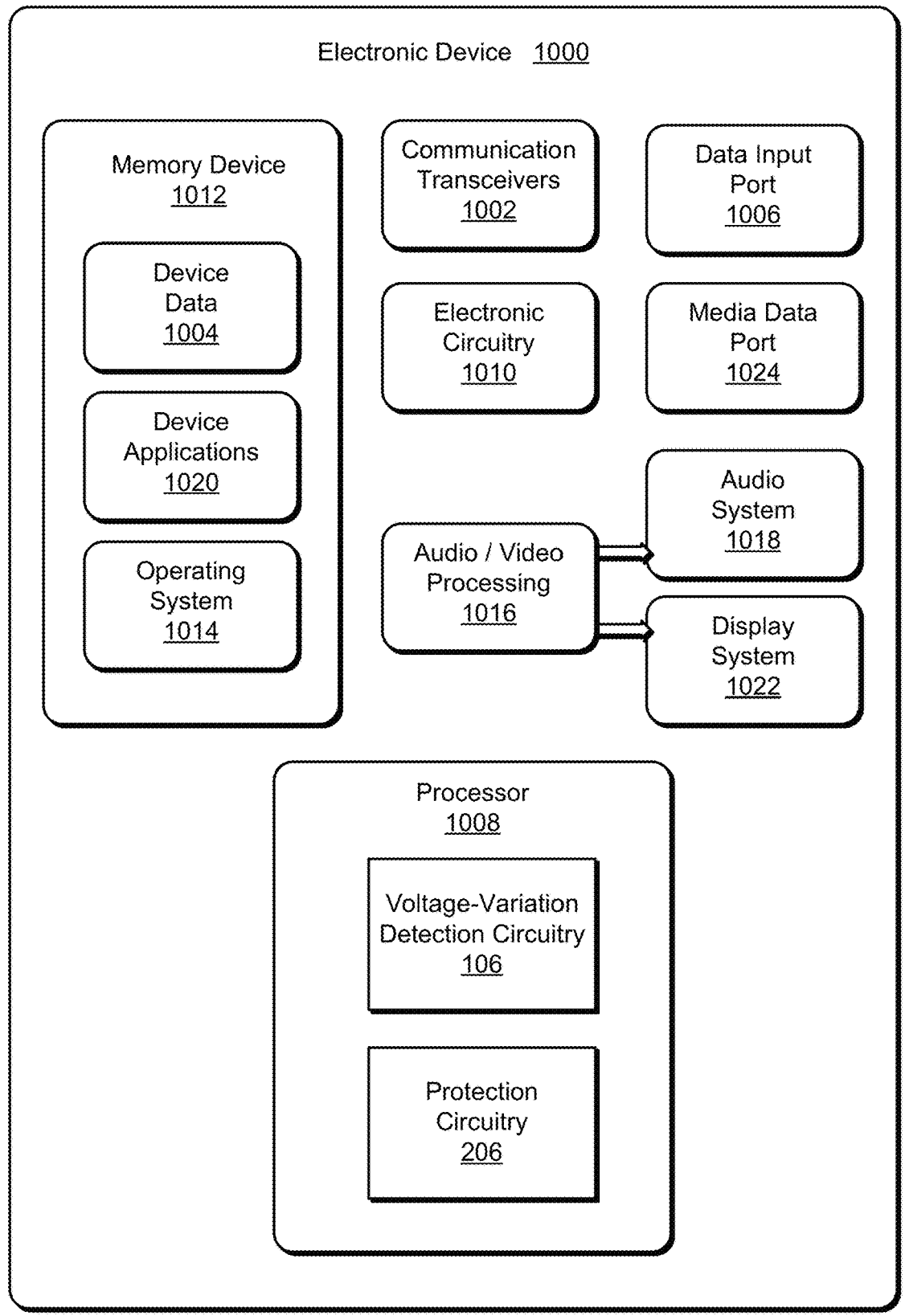
FIG. 10 illustrates various components of an example electronic device that can implement voltage-variation detection under clock fluctuations in accordance with one or more described aspects.

FIG. 10 illustrates various components of an example electronic device 1000 that can implement voltage-variation detection under clock fluctuations in accordance with one or more described aspects. The electronic device 1000 may be implemented as any one or combination of a fixed, mobile, stand-alone, or embedded device; in any form of a consumer, computer, portable, user, server, communication, phone, navigation, gaming, audio, camera, messaging, media playback, and/or other type of electronic device 1000, such as the smartphone that is depicted FIG. 1 as the apparatus 102.

Electronic device 1000 can include one or more communication transceivers 1002 that enable wired and/or wireless communication of device data 1004, such as received data, transmitted data, or other information as described above. Example communication transceivers 1002 include NFC transceivers, wireless personal area network (PAN) (WPAN) radios compliant with various IEEE 802.15 (Bluetooth™) standards, wireless local area network (LAN) (WLAN) radios compliant with any of the various IEEE 802.11 (Wi-Fi™) standards, wireless wide area network (WAN) (WWAN) radios (e.g., those that are 3GPP-compliant) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (LAN) Ethernet transceivers.

The electronic device 1000 may also include one or more data input ports 1006 via which any type of data, media content, and/or other inputs can be received, such as user-selectable inputs, messages, applications, music, television content, recorded video content, and any other type of audio, video, and/or image data received from any content and/or data source. The data input ports 1006 may include USB ports, coaxial cable ports, fiber optic ports for optical fiber interconnects or cabling, and other serial or parallel connectors (including internal connectors) for flash memory, DVDs, CDs, and the like. These data input ports 1006 may be used to couple the electronic device to components, peripherals, or accessories such as keyboards, microphones, cameras, or other sensors.

The electronic device 1000 of this example includes at least one processor 1008 (e.g., any one or more of application processors, microprocessors, digital-signal processors (DSPs), controllers, and the like), which can include a combined processor and memory system (e.g., implemented as part of an SoC), that processes (e.g., executes) computer-executable instructions to control operation of the device. The processor 1008 may be implemented as an application processor, embedded controller, microcontroller, security processor, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other materials.

Alternatively or additionally, the electronic device 1000 can be implemented with any one or combination of electronic circuitry, which may include software, hardware, firmware, or fixed logic circuitry that is implemented in connection with processing and control circuits, which are generally indicated at 1010 (as electronic circuitry 1010). This electronic circuitry 1010 can implement executable or hardware-based modules (not shown in FIG. 10), such as through processing/computer-executable instructions stored on computer-readable media, through logic circuitry and/or hardware (e.g., such as an FPGA), and so forth.

Although not shown, the electronic device 1000 can include a system bus, interconnect, crossbar, or data transfer system that couples the various components within the device. A system bus or interconnect can include any one or a combination of different bus structures, such as a memory bus or memory controller, a peripheral bus, a universal serial bus, and/or a processor or local bus that utilizes any of a variety of bus architectures.

The electronic device 1000 also includes one or more memory devices 1012 that enable data storage, examples of which include random access memory (RAM), non-volatile memory (e.g., read-only memory (ROM), flash memory, EPROM, and EEPROM), and a disk storage device. Thus, the memory device(s) 1012 can be distributed across different logical storage levels of a system as well as at different physical components. The memory device(s) 1012 provide data storage mechanisms to store the device data 1004, other types of code and/or data, and various device applications 1020 (e.g., software applications or programs). For example, an operating system 1014 can be maintained as software instructions within the memory device 1012 and executed by the processor 1008.

In some implementations, the electronic device 1000 also includes an audio and/or video processing system 1016 that processes audio data and/or passes through the audio and video data to an audio system 1018 and/or to a display system 1022 (e.g., a video buffer or a screen of a smartphone or camera). The audio system 1018 and/or the display system 1022 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as a media data port 1024. In some implementations, the audio system 1018 and/or the display system 1022 are external or separate components of the electronic device 1000. Alternatively, the display system 1022 can be an integrated component of the example electronic device 1000, such as part of an integrated touch interface.

The electronic device 1000 of FIG. 10 is an example implementation of the apparatus 102 of FIG. 1. Thus, the processor 1008 is an example of the IC 104 (e.g., of FIGS. 1 and 2). The processor 1008 is illustrated as including an instance of the voltage-variation detection circuitry 106 and an instance of the protection circuitry 206. As described above, one or more of these circuitry components may be part of a same IC chip such as that of the processor 1008 or may instead be located on separate dies. For example, the voltage-variation detection circuitry 106 may be located on a separate security-oriented chip while the protection circuitry 206 is located on a separate CPU chip. Alternatively, the voltage-variation detection circuitry 106 may be located on one portion of a chip while the protection circuitry 206 is located on a different portion or core of the same chip. Although not explicitly illustrated, the memory device 1012 may include an instance of the voltage-variation detection circuitry 106 or the protection circuitry 206. Thus, the principles of voltage-variation detection under clock fluctuations as described herein can be implemented by, or in conjunction with, the electronic device 1000 of FIG. 10.

ADDITIONAL EXAMPLES

In the following, some examples are described.

Example 1

An apparatus comprising: a clock line configured to propagate a clock signal; a first voltage-dependent circuit coupled to the clock line, the first voltage-dependent circuit configured to produce a first signal that is indicative of a voltage level responsive to the clock signal and based on a first voltage sensitivity; a second voltage-dependent circuit coupled to the clock line, the second voltage-dependent circuit configured to produce a second signal that is indicative of the voltage level responsive to the clock signal and based on a second voltage sensitivity; and a voltage analysis circuit coupled to the first voltage-dependent circuit and the second voltage-dependent circuit, the voltage analysis circuit configured to generate a voltage alert signal based on the first signal and the second signal.

Example 2

The apparatus of example 1, wherein: the voltage analysis circuit comprises a signal combiner circuit configured to combine the first signal and the second signal to produce a combined signal; and the voltage analysis circuit is configured to generate the voltage alert signal based on the combined signal.

Example 3

The apparatus of example 2, wherein: the voltage analysis circuit comprises a signal comparison circuit configured to compare the first signal and the second signal to produce a comparison signal indicative of a relative delay size between the first signal and the second signal; and the voltage analysis circuit is configured to generate the voltage alert signal based on the comparison signal, the combined signal, and at least one voltage threshold.

Example 4

The apparatus of any one of examples 1 to 3, wherein: the clock signal is configured to undergo a frequency fluctuation during operation of the first voltage-dependent circuit and the second voltage-dependent circuit; and the voltage alert signal is indicative of the voltage level being outside a target voltage range.

Example 5

The apparatus of example 4, further comprising: protection circuitry coupled to the voltage analysis circuit and configured to accept the voltage alert signal, the protection circuitry configured to take at least one action to protect the apparatus responsive to the voltage level being outside the target voltage range, wherein: the apparatus comprises an electronic device including at least one integrated circuit; and the at least one integrated circuit comprises the first voltage-dependent circuit, the second voltage-dependent circuit, and the voltage analysis circuit.

Example 6

The apparatus of any one of examples 1 to 5, wherein: the first voltage sensitivity corresponds to a first propagation speed of the clock signal within the first voltage-dependent circuit, the first propagation speed responsive to the voltage level; the second voltage sensitivity corresponds to a second propagation speed of the clock signal within the second voltage-dependent circuit, the second propagation speed responsive to the voltage level; and the first propagation speed is different from the second propagation speed.

Example 7

The apparatus of any one of examples 1 to 6, wherein the first voltage-dependent circuit comprises: a delay circuit coupled to the clock line and configured to delay the clock signal to produce a delayed clock signal; and a sample circuit coupled between the delay circuit and the voltage analysis circuit, the sample circuit configured to sample the delayed clock signal to produce the first signal.

Example 8

The apparatus of example 7, wherein the sample circuit comprises: multiple buffer units coupled together in series, the multiple buffer units comprising an initial buffer unit that is coupled to the delay circuit and configured to accept the delayed clock signal, the multiple buffer units configured to jointly produce multiple buffered versions of the delayed clock signal; and multiple register units, each register unit of the multiple register units coupled to a respective buffer unit of the multiple buffer units, the multiple register units configured to jointly latch the multiple buffered versions of the delayed clock signal to produce the first signal.

Example 9

The apparatus of example 7 or 8, wherein the delay circuit is configured to provide a programmable delay amount to delay the clock signal and produce the delayed clock signal, the delay circuit comprising: multiple delay units coupled together in series; and at least one multiplexer including at least one control input.

Example 10

The apparatus of example 9, further comprising: a calibration circuit configured to establish the programmable delay amount using the at least one control input of the at least one multiplexer.

Example 11

The apparatus of example 10, wherein: the calibration circuit is configured to establish the programmable delay amount based on a quantity of buffer units of multiple buffer units of the sample circuit, a nominal voltage level, a minimum voltage, and a maximum voltage.

Example 12

The apparatus of any one of examples 7 to 11, wherein: the second voltage-dependent circuit comprises: a delay circuit coupled to the clock line and configured to delay the clock signal to produce a delayed clock signal; and a sample circuit coupled between the delay circuit of the second voltage-dependent circuit and the voltage analysis circuit, the sample circuit of the second voltage-dependent circuit configured to sample the delayed clock signal from the delay circuit of the second voltage-dependent circuit to produce the second signal; the delay circuit of the first voltage-dependent circuit comprises a first transistor having a first threshold voltage; the delay circuit of the second voltage-dependent circuit comprises a second transistor having a second threshold voltage; and the first threshold voltage is lower than the second threshold voltage.

Example 13

The apparatus of any one of examples 1 to 11, wherein: the clock line is configured to propagate the clock signal with one or more frequency fluctuations; the first voltage-dependent circuit is configured to propagate the clock signal using at least one first transistor having a first threshold voltage to produce the first signal that is indicative of the voltage level; the second voltage-dependent circuit is configured to propagate the clock signal using at least one second transistor having a second threshold voltage to produce the second signal that is indicative of the voltage level; and the voltage analysis circuit is configured to detect a voltage-based attack by neutralizing the one or more frequency fluctuations of the clock signal based on a combination of the first signal and the second signal to generate the voltage alert signal.

Example 14

The apparatus of example 13, wherein the apparatus comprises an integrated circuit, the integrated circuit comprising: a memory configured to store a secret key; and protection circuitry coupled to the voltage analysis circuit and configured to protect the secret key responsive to detection of the voltage-based attack.

Example 15

The apparatus of any one of examples 1 to 14, wherein: the clock line is configured to propagate the clock signal with one or more frequency fluctuations; the first voltage-dependent circuit is configured to produce the first signal with at least one characteristic resulting from the one or more frequency fluctuations of the clock signal; the second voltage-dependent circuit is configured to produce the second signal with the at least one characteristic resulting from the one or more frequency fluctuations of the clock signal; the voltage analysis circuit is configured to combine the first signal and the second signal to produce a combined signal to substantially cancel the at least one characteristic that results from the one or more frequency fluctuations of the clock signal and that is present in the first signal and the second signal; and the voltage analysis circuit is configured to generate the voltage alert signal based on the combined signal.

Example 16

A method by an apparatus for voltage-variation detection under clock fluctuations, the method comprising: providing a clock signal; producing a first signal indicative of a voltage level responsive to propagating the clock signal based on a first voltage sensitivity; producing a second signal indicative of the voltage level responsive to propagating the clock signal based on a second voltage sensitivity; and generating a voltage alert signal based on the first signal and the second signal.

Example 17

The method of example 16, wherein: the providing comprises providing the clock signal with one or more frequency fluctuations; the producing the first signal comprises producing the first signal with at least one characteristic resulting from the one or more frequency fluctuations of the clock signal; the producing the second signal comprises producing the second signal with the at least one characteristic resulting from the one or more frequency fluctuations of the clock signal; and the generating comprises combining the first signal and the second signal to substantially cancel the at least one characteristic resulting from the one or more frequency fluctuations that is present in the first signal and the second signal.

Example 18

The method of example 16 or 17, wherein: the producing the first signal comprises propagating the clock signal at a first propagation speed based on the first voltage sensitivity; and the producing the second signal comprises propagating the clock signal at a second propagation speed based on the second voltage sensitivity.

Example 19

The method of any one of examples 16 to 18, wherein: the producing the first signal comprises: delaying the clock signal by a first delay amount to produce a first delayed clock signal; and sampling the first delayed clock signal at multiple different instances to produce the first signal; and the producing the second signal comprises: delaying the clock signal by a second delay amount to produce a second delayed clock signal; and sampling the second delayed clock signal at multiple different instances to produce the second signal.

Example 20

The method of any one of examples 16 to 19, wherein the generating comprises: generating, using the first signal and the second signal, the voltage alert signal responsive to the voltage level being outside a target voltage range.

Example 21

The method of any one of examples 16 to 20, wherein the generating comprises: generating the voltage alert signal to be indicative of a positive voltage glitch responsive to the second signal being greater than the first signal and based on a difference between the second signal and the first signal being greater than a positive delta threshold.

Example 22

The method of any one of examples 16 to 21, wherein the generating comprises: generating the voltage alert signal to be indicative of a negative voltage glitch responsive to the first signal being greater than the second signal and based on a difference between the first signal and the second signal being greater than a negative delta threshold.

Example 23

An integrated circuit comprising: a clock line configured to propagate a clock signal with one or more frequency fluctuations; a first voltage-dependent circuit coupled to the clock line, the first voltage-dependent circuit configured to propagate the clock signal using at least one first transistor having a first threshold voltage to produce a first signal that is indicative of a voltage level; a second voltage-dependent circuit coupled to the clock line, the second voltage-dependent circuit configured to propagate the clock signal using at least one second transistor having a second threshold voltage to produce a second signal that is indicative of the voltage level; and a voltage analysis circuit coupled to the first voltage-dependent circuit and the second voltage-dependent circuit, the voltage analysis circuit configured to detect a voltage-based attack by neutralizing the one or more frequency fluctuations of the clock signal based on a combination of the first signal and the second signal.

Example 24

The integrated circuit of example 23, further comprising: a memory configured to store a secret key; and protection circuitry coupled to the voltage analysis circuit and configured to protect the secret key responsive to detection of the voltage-based attack.

Example 25

The apparatus of any one of examples 1 to 15, wherein: the first voltage-dependent circuit includes a first delay circuit, the first delay circuit including at least one first delay unit comprising at least one first transistor having a first threshold voltage, the first delay circuit coupled to the clock line and configured to delay the clock signal using the at least one first transistor; the second voltage-dependent circuit includes a second delay circuit, the second delay circuit including at least one second delay unit comprising at least one second transistor having a second threshold voltage, the second delay circuit coupled to the clock line and configured to delay the clock signal using the at least one second transistor; and the first threshold voltage is different from the second threshold voltage.

Example 26

The apparatus of example 25, wherein: the first voltage-dependent circuit is configured to produce the first signal based on the first threshold voltage of the at least one first transistor; the second voltage-dependent circuit is configured to produce the second signal based on the second threshold voltage of the at least one second transistor; and the voltage analysis circuit is configured to generate the voltage alert signal based on a combination of the first signal and the second signal.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for voltage-variation detection under clock fluctuations have been described in language specific to certain features and/or methods, the subject of the appended claims is not necessarily limited to the specific features or methods described. Rather, the specific features and methods are disclosed as example implementations for voltage-variation detection under clock fluctuations.

What is claimed is:

1. An apparatus comprising:
    a clock line configured to propagate a clock signal;
    a first voltage-dependent circuit coupled to the clock line, the first voltage-dependent circuit configured to produce a first signal that is indicative of a voltage level responsive to the clock signal and based on a first voltage sensitivity;
    a second voltage-dependent circuit coupled to the clock line, the second voltage-dependent circuit configured to produce a second signal that is indicative of the voltage level responsive to the clock signal and based on a second voltage sensitivity; and
    a voltage analysis circuit coupled to the first voltage-dependent circuit and the second voltage-dependent circuit, the voltage analysis circuit comprising:
        a signal combiner circuit configured to combine the first signal and the second signal to produce a combined signal; and
        a signal comparison circuit configured to compare the first signal and the second signal to produce a comparison signal indicative of a relative delay size between the first signal and the second signal,
        the voltage analysis circuit configured to generate a voltage alert signal based on the comparison signal, the combined signal, and at least one voltage threshold.

2. The apparatus of claim 1, wherein the voltage analysis circuit comprises analysis logic configured to:
    perform a comparison operation including the combined signal and the at least one voltage threshold; and
    generate the voltage alert signal based on the comparison operation.

3. The apparatus of claim 2, wherein the at least one voltage threshold comprises:
    a positive delta threshold; and
    a negative delta threshold.

4. The apparatus of claim 1, wherein:
    the clock signal is configured to undergo a frequency fluctuation during operation of the first voltage-dependent circuit and the second voltage-dependent circuit; and
    the voltage alert signal is indicative of the voltage level being outside a target voltage range.

5. The apparatus of claim 4, further comprising:
    protection circuitry coupled to the voltage analysis circuit and configured to accept the voltage alert signal, the protection circuitry configured to take at least one action to protect the apparatus responsive to the voltage level being outside the target voltage range, wherein:
the apparatus comprises an electronic device including at least one integrated circuit; and
the at least one integrated circuit comprises the first voltage-dependent circuit, the second voltage-dependent circuit, and the voltage analysis circuit.

6. The apparatus of claim 1, wherein:
the first voltage sensitivity corresponds to a first propagation speed of the clock signal within the first voltage-dependent circuit, the first propagation speed responsive to the voltage level;
the second voltage sensitivity corresponds to a second propagation speed of the clock signal within the second voltage-dependent circuit, the second propagation speed responsive to the voltage level; and
the first propagation speed is different from the second propagation speed.

7. The apparatus of claim 1, wherein the first voltage-dependent circuit comprises:
a delay circuit coupled to the clock line and configured to delay the clock signal to produce a delayed clock signal; and
a sample circuit coupled between the delay circuit and the voltage analysis circuit, the sample circuit configured to sample the delayed clock signal to produce the first signal.

8. The apparatus of claim 7, wherein the sample circuit comprises:
multiple buffer units coupled together in series, the multiple buffer units comprising an initial buffer unit that is coupled to the delay circuit and configured to accept the delayed clock signal, the multiple buffer units configured to jointly produce multiple buffered versions of the delayed clock signal; and
multiple register units, each register unit of the multiple register units coupled to a respective buffer unit of the multiple buffer units, the multiple register units configured to jointly latch the multiple buffered versions of the delayed clock signal to produce the first signal.

9. The apparatus of claim 7, wherein the delay circuit is configured to provide a programmable delay amount to delay the clock signal and produce the delayed clock signal, the delay circuit comprising:
multiple delay units coupled together in series; and
at least one multiplexer including at least one control input.

10. The apparatus of claim 9, further comprising:
a calibration circuit configured to establish the programmable delay amount using the at least one control input of the at least one multiplexer.

11. The apparatus of claim 7, wherein:
the second voltage-dependent circuit comprises:
a delay circuit coupled to the clock line and configured to delay the clock signal to produce a delayed clock signal; and
a sample circuit coupled between the delay circuit of the second voltage-dependent circuit and the voltage analysis circuit, the sample circuit of the second voltage-dependent circuit configured to sample the delayed clock signal from the delay circuit of the second voltage-dependent circuit to produce the second signal;
the delay circuit of the first voltage-dependent circuit comprises a first transistor having a first threshold voltage;
the delay circuit of the second voltage-dependent circuit comprises a second transistor having a second threshold voltage; and
the first threshold voltage is lower than the second threshold voltage.

12. The apparatus of claim 1, wherein:
the clock line is configured to propagate the clock signal with one or more frequency fluctuations;
the first voltage-dependent circuit is configured to produce the first signal with at least one characteristic resulting from the one or more frequency fluctuations of the clock signal;
the second voltage-dependent circuit is configured to produce the second signal with the at least one characteristic resulting from the one or more frequency fluctuations of the clock signal; and
the signal combiner circuit of the voltage analysis circuit is configured to combine the first signal and the second signal to produce the combined signal to substantially cancel the at least one characteristic that results from the one or more frequency fluctuations of the clock signal and that is present in the first signal and the second signal.

13. A method by an apparatus for voltage-variation detection under clock fluctuations, the method comprising:
providing a clock signal;
producing a first signal indicative of a voltage level responsive to propagating the clock signal based on a first voltage sensitivity;
producing a second signal indicative of the voltage level responsive to propagating the clock signal based on a second voltage sensitivity;
combining the first signal and the second signal to produce a combined signal;
comparing the first signal and the second signal to produce a comparison signal indicative of a relative delay size between the first signal and the second signal; and
generating a voltage alert signal based on the comparison signal, the combined signal, and at least one voltage threshold.

14. The method of claim 13, wherein:
the providing comprises providing the clock signal with one or more frequency fluctuations;
the producing the first signal comprises producing the first signal with at least one characteristic resulting from the one or more frequency fluctuations of the clock signal;
the producing the second signal comprises producing the second signal with the at least one characteristic resulting from the one or more frequency fluctuations of the clock signal; and
the combining comprises combining the first signal and the second signal to substantially cancel the at least one characteristic resulting from the one or more frequency fluctuations that is present in the first signal and the second signal.

15. The method of claim 13, wherein:
the producing the first signal comprises propagating the clock signal at a first propagation speed based on the first voltage sensitivity; and
the producing the second signal comprises propagating the clock signal at a second propagation speed based on the second voltage sensitivity.

16. The method of claim 13, wherein:
the producing the first signal comprises:
delaying the clock signal by a first delay amount to produce a first delayed clock signal; and sampling the first delayed clock signal at multiple different instances to produce the first signal; and the producing the second signal comprises:

delaying the clock signal by a second delay amount to produce a second delayed clock signal; and sampling the second delayed clock signal at multiple different instances to produce the second signal.

17. The method of claim 13, wherein the generating comprises:

generating, using the first signal and the second signal, the voltage alert signal responsive to the voltage level being outside a target voltage range.

18. The method of claim 13, wherein the generating comprises at least one of:

generating the voltage alert signal to be indicative of a positive voltage glitch responsive to the second signal being greater than the first signal and based on a difference between the second signal and the first signal being greater than a positive delta threshold; or generating the voltage alert signal to be indicative of a negative voltage glitch responsive to the first signal being greater than the second signal and based on a difference between the first signal and the second signal being greater than a negative delta threshold.

19. An integrated circuit comprising:

a clock line configured to propagate a clock signal with one or more frequency fluctuations;

a first voltage-dependent circuit coupled to the clock line, the first voltage-dependent circuit configured to propagate the clock signal using at least one first transistor having a first threshold voltage to produce a first signal that is indicative of a voltage level;

a second voltage-dependent circuit coupled to the clock line, the second voltage-dependent circuit configured to propagate the clock signal using at least one second transistor having a second threshold voltage to produce a second signal that is indicative of the voltage level; and a voltage analysis circuit coupled to the first voltage-dependent circuit and the second voltage-dependent circuit, the voltage analysis circuit configured to:

combine the first signal and the second signal to produce a combined signal;

neutralize the one or more frequency fluctuations of the clock signal based on the combination of the first signal and the second signal; and detect a voltage-based attack based on the combined signal and responsive to the neutralization of the one or more frequency fluctuations of the clock signal.

20. The integrated circuit of claim 19, further comprising:

a memory configured to store a secret key; and protection circuitry coupled to the voltage analysis circuit and configured to protect the secret key responsive to the detection of the voltage-based attack.

* * * * *